US009651961B2

(12) United States Patent
Muthukaruppan et al.

(10) Patent No.: US 9,651,961 B2
(45) Date of Patent: May 16, 2017

(54) MULTI-MODE VOLTAGE REGULATION WITH FEEDBACK

(71) Applicants:Ramnarayanan Muthukaruppan, Bangalore (IN); Pradyumna Agashe, Bangalore (IN); Uday Bhaskar Kadali, Bangalore (IN); Jnaneshwar Madugonda, Bangalore (IN)

(72) Inventors: Ramnarayanan Muthukaruppan, Bangalore (IN); Pradyumna Agashe, Bangalore (IN); Uday Bhaskar Kadali, Bangalore (IN); Jnaneshwar Madugonda, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 14/129,593

(22) PCT Filed: Dec. 21, 2012

(86) PCT No.: PCT/US2012/071181
§ 371 (c)(1),
(2) Date: Dec. 27, 2013

(87) PCT Pub. No.: WO2013/101718
PCT Pub. Date: Jul. 4, 2013

(65) Prior Publication Data
US 2014/0344589 A1 Nov. 20, 2014

(30) Foreign Application Priority Data
Dec. 27, 2011 (IN) .......................... 3828/DEL/2011

(51) Int. Cl.
*G06F 1/26* (2006.01)
*G05F 1/575* (2006.01)
*H02M 3/07* (2006.01)

(52) U.S. Cl.
CPC ................ *G05F 1/575* (2013.01); *G06F 1/26* (2013.01); *H02M 3/07* (2013.01); *H02M 2003/077* (2013.01)

(58) Field of Classification Search
CPC ... G05F 1/575; H02M 2003/077; H02M 3/07; G06F 1/263; G06F 1/26
(Continued)

(56) References Cited

U.S. PATENT DOCUMENTS 4,649,291 A    3/1987   Konishi
5,773,966 A * 6/1998   Steigerwald .......... H02M 3/158
                                                                 323/284

(Continued)

FOREIGN PATENT DOCUMENTS

| KR | 10-0785150 B1 | 12/2007 |
| WO | 2007149517 A2 | 12/2007 |
| WO | 2013/100890 A1 | 7/2013 |
| WO | 2013/101718 A1 | 7/2013 |

OTHER PUBLICATIONS

Office Action received for Taiwan Patent Application No. 101149527, mailed on Aug. 25, 2015, 3 pages of Taiwan Office Action only.
(Continued)

*Primary Examiner* — Zahid Choudhury
(74) *Attorney, Agent, or Firm* — Garrett IP, LLC

(57) ABSTRACT

Methods and systems to regulate a voltage with multiple selectable voltage regulator (VR) modes, using multiple corresponding circuits and/or a configurable circuit. The circuit may be configurable for one or more of a power-gate VR mode, a switched-capacitor VR (SCVR) mode, and a linear mode, such as a low drop-out (LDO) VR mode. A feedback controller, such as a proportional-integral-derivative (PID) controller, may configure and/or control a multi-mode VR for a selected VR mode. The feedback controller
(Continued)

may select a VR mode based on a reference voltage and voltage ranges associated with the VR modes. The circuit may be configurable as banks of VRs, and the controller may be implemented to transition between VR modes by switching sub-banks between modes until the transition is complete.

17 Claims, 18 Drawing Sheets

(58) Field of Classification Search
IPC ....... G05F 1/575; H02M 2003/077,3/07; G06F 1/263, 1/26
See application file for complete search history.

(56) References Cited

U.S. PATENT DOCUMENTS

| | | | |
|---|---|---|---|
| 5,955,870 A * | 9/1999 | Nair .................. | G05F 1/575 323/273 |
| 6,504,422 B1 | 1/2003 | Rader et al. | |
| 6,636,023 B1 * | 10/2003 | Amin .................. | G05F 1/56 323/268 |
| 7,112,978 B1 | 9/2006 | Koniaris et al. | |
| 7,190,210 B2 * | 3/2007 | Azrai .................. | H02M 3/07 257/298 |
| 7,454,643 B2 | 11/2008 | He et al. | |
| 7,498,835 B1 | 3/2009 | Rahman et al. | |
| 7,518,355 B2 | 4/2009 | Grassi et al. | |
| 7,525,373 B1 | 4/2009 | Ogilvie et al. | |
| 7,759,916 B2 * | 7/2010 | Kleveland ............ | G05F 1/563 323/268 |
| 8,564,262 B2 * | 10/2013 | Bose .................. | G05F 1/565 323/268 |
| 2001/0052800 A1 | 12/2001 | Mizuno | |
| 2002/0138778 A1 | 9/2002 | Cole et al. | |
| 2006/0033551 A1 | 2/2006 | Dong et al. | |
| 2006/0087297 A1 | 4/2006 | Deng | |
| 2006/0224337 A1 | 10/2006 | Hazucha et al. | |
| 2007/0018622 A1 * | 1/2007 | Chen .................. | H02M 1/10 323/282 |
| 2007/0164806 A1 | 7/2007 | Gasper et al. | |
| 2007/0234078 A1 | 10/2007 | Nguyen | |
| 2008/0238407 A1 | 10/2008 | Grassi et al. | |
| 2009/0085607 A1 | 4/2009 | Zelikson et al. | |
| 2009/0230934 A1 | 9/2009 | Hooijschuur et al. | |
| 2009/0322304 A1 * | 12/2009 | Oraw .................. | H02J 1/102 323/312 |
| 2010/0033151 A1 * | 2/2010 | Wu .................... | H02M 3/1584 323/285 |
| 2010/0072961 A1 * | 3/2010 | Kosonocky ............ | H01L 25/16 323/281 |
| 2010/0292856 A1 | 11/2010 | Fujita | |
| 2011/0188218 A1 | 8/2011 | Hsing et al. | |
| 2014/0159681 A1 * | 6/2014 | Oraw .................. | H02J 1/102 323/271 |
| 2014/0359333 A1 * | 12/2014 | Nguyen ............... | G06F 1/26 713/323 |
| 2015/0149794 A1 | 5/2015 | Zelikson et al. | |

OTHER PUBLICATIONS

Office Action received for Taiwan Patent Application No. 101149527, mailed on Mar. 11, 2015, 16 pages of Taiwan Office Action and 1 page of English Search Report.

Office Action received for Taiwan Patent Application No. 101149598, mailed on Feb. 12, 2015, 4 pages of English Translation and 3 pages of Taiwan Office Action.

Extended European Search Report received for European Patent Application No. 11878840.5, mailed on Jun. 22, 2015, 8 pages.

Extended European Search Report received for EP Patent Application No. 12863334.4, mailed on Aug. 7, 2015, 6 pages.

Guo, et al., "A multi-modes charge-pump based high efficiency wide input range DC-DC converter", Energy Conversion Congress and Exposition (ECCE), IEEE, Sep. 2010, pp. 2706-2712.

Zhang, et al., "A Digital Multi-Mode Multi-Phase IC Controller for Voltage Regulator Application", Applied Power Electronics Conference, IEEE, Feb. 25, 2007, pp. 719-726.

International Search Report and Written Opinion received for PCT Patent Application No. PCT/US2012/071181, mailed on Feb. 28, 2013, 9 pages.

Office Action Received for Chinese Patent Application No. 201220734566.3, mailed on May 7, 2013, 2 pages of English Translation and 1 page of Office Action.

International Search Report and Written Opinion received for PCT Patent Application No. PCT/US2011/067334, mailed on Sep. 3, 2012, 9 pages.

Office Action received for Chinese Patent Application No. 201220734910.9, mailed on Apr. 25, 2013, 3 pages of English Translation and 2 pages of Office Action.

Office Action received for Chinese Patent Application No. 201220734910.9, mailed on Aug. 19, 2013, 2 pages of English Translation and 1 page of Office Action.

"Freescale's Leading-Edge PMIC Solution", Analog, Mixed Signal and Power Management, Designed for the Intel® Atom™ Z6xx mobile platform, 2010, 2 pages.

"DC-DC Conversion Without Inductors", APP 725: Jul. 22, 2009 Tutorial 725, AN725, AN 725, APP725, Appnote725, Appnote 725, Jul. 22, 2009, 5 pages.

Rao, Arun, "An Efficient Switched Capacitor Buck-boostvoltage Regulator Using Delta-sigma Control Loop", A Thesis submitted to Oregon State University in partial fulfillment of the requirements for the degree of Master of Science, Apr. 29, 2002, 56 pages.

Seeman, Michael Douglas, "A Design Methodology for Switched-Capacitor DC-DC Converters", Electrical Engineering and Computer Sciences, University of California at Berkeley, May 21, 2009, 249 pages.

Wikipedia, "Low-dropout regulator", From Wikipedia, the free encyclopedia, Nov. 14, 2011, 2 pages. Weblink available at: http://en.wikipedia.org/wiki/Low-dropout_regulator.

Wikipedia, "PID controller", From Wikipedia, the free encyclopedia, Nov. 14, 2011, 18 pages. Weblink available at: http://en.wikipedia.org/wiki/PID_controller.

Wikipedia, "Voltage regulator", From Wikipedia, the free encyclopedia, Nov. 14, 2011, 9 pages. Weblink available at: http://en.wikipedia.org/wiki/Voltage_regulator.

Notice of Grant received for Chinese Patent Application No. 201220734566.3, mailed on Aug. 29, 2013, 1 page of English Translation and 2 pages of Notice of Grant.

Notice of Grant received for Chinese Patent Application No. 201220734910.9, mailed on Jan. 14, 2014, 1 page of English Translation and 2 pages of Notice of Grant.

International Preliminary Report on Patentability and Written Opinion received for PCT Patent Application No. PCT/US2011/067334, mailed on Jul. 10, 2014, 6 pages.

International Preliminary Report on Patentability and Written Opinion received for PCT Patent Application No. PCT/US2012/071181, mailed on Jul. 10, 2014, 6 pages.

* cited by examiner (Configuration: SCVR Mode 1:¾)

SCVR Mode 1:¾, Phase 1 (ø1=0, ø2=1)

SCVR Mode 1:¾, Phase 2 (ø1=1, ø2=0)

(SCVR Mode 1:½)

(Configuration: SCVR Mode 1:2/3)

(Configuration: SCVR Mode 1:2/3)

(Configuration: LDR Mode)

(Configuration: LDR Mode, Equivalent)

(Configuration: Gate Mode)

(Configuration: Gate Mode, Equivalent)

MULTI-MODE VOLTAGE REGULATION WITH FEEDBACK

BACKGROUND

Power consumption management is important with battery-powered computing and/or communication devices and other devices.

Processor cores and graphics partitions consume significant amounts of power in battery-operated devices. Mobile telephones, for example, may include dual processor cores and tablet computers may include quad processor cores. Future tablet computers may include 8 or more cores. Future systems may also include increasing numbers of applications that run multiple threads to exploit the increasing numbers of processor cores. Graphics processing demands are also expected increase. Each of these factors may impact the rate of battery discharge.

A conventional mobile or battery-powered device may include an external power management IC (PMIC) to provide an off-die regulated voltage rail to a system-on-a-chip (SoC) IC to power all processor cores and a graphics processor or partition within the SoC. The off-die regulated voltage may be referred to as a PMIC VID (power power management IC voltage identification digital).

Such a shared off-die regulated voltage rail may preclude optimization of voltages provided to individual cores. Multiple off-die voltage rails may be generated from an initial off-die regulated voltage to permit per-core optimization, but at the expense of additional per-rail circuitry, such as for guard band and filtering discussed below.

An off-die regulated voltage rail may require more guard band than an on-die regulated voltage to account for variations and/or tolerance requirements in an on-die power delivery path.

An off-die regulated voltage rail may switch at a relatively low frequency, which may be less than 1 mega Hertz (Mhz). This may correspond to relatively bulky filter components having relatively long transient times, which may slow transitions between wake and sleep states of processor cores within the SoC. As a result, cores may be transitioned to a sleep state later than desired, and transitioned to a wake state sooner than necessary, resulting in less time in the sleep state.

Similar issues may arise where a graphics processor or graphics partition includes multiple execution units and memory blocks, collectively referred to herein as graphics processor elements.

Conventional voltage regulators (VRs) include switched-capacitor VRs (SCVRs) and linear VRs, such as low drop-out (LDO) VRs. A given type of VR may be relatively efficient within a designated voltage range, but may be relatively inefficient at voltages outside of the designated range. Each type of VR may include a corresponding VR controller. It may thus be impractical to implement multiple VRs and corresponding VR controllers on-die, for core and/or graphics processor element.

BRIEF DESCRIPTION OF THE DRAWINGS/FIGURES

Figure 1:
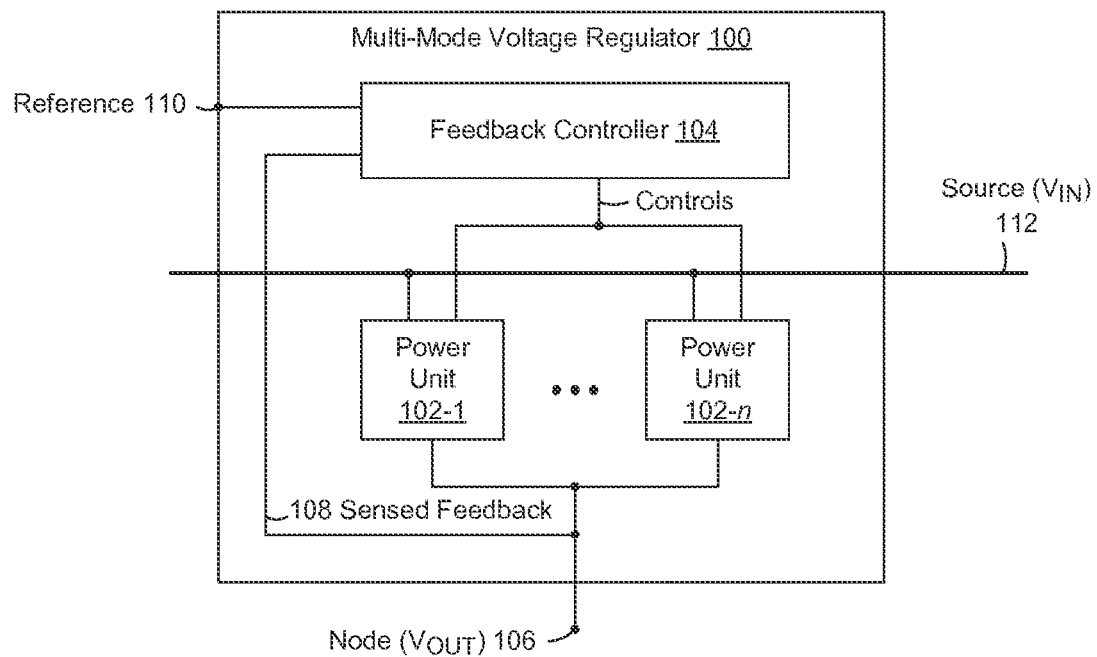
FIG. 1 is a block diagram of a voltage regulator (VR) including a feedback controller to select and control one of multiple power units (PUs) to regulate a voltage based on a sensed feedback and a reference voltage.

In the drawings, the leftmost digit(s) of a reference number identifies the drawing in which the reference number first appears.

DETAILED DESCRIPTION

FIG. 1 is a block diagram of a multi-mode voltage regulator (VR) 100 including a feedback controller 104 to configure and/or control multiple power units (PUs) 102-1 through 102-n to regulate a voltage at a node 106 based on a selected VR mode, sensed feedback 108, and a reference 110. Controller 104 may include a digital and/or analog feedback controller.

Node 106 may represent a voltage rail of the IC or a sub-rail dedicated to a portion or domain of circuitry within the IC die, such as described below with reference to FIG. 17.

Reference 110 may represent a target voltage for a regulated voltage VOUT at a node 106. Reference 110 may be received as a target voltage and/or a digital code indicative of the target voltage, such as a VID ("voltage identification digital"). Where reference 110 includes a digital code, controller 104 may be implemented to convert the digital code to the target voltage. Reference 110 may be received from a power management system or power management unit (PMU).

PUs 102 may receive power from a power supply or source 112. Where VR 100 is implemented within an integrated circuit (IC) die, source 112 may represent an off-die power source provided through a substrate on which the IC die may be mounted, or an on-die power source, such as a regulated voltage rail of the IC, which may be referred to herein as $V_{CC}$.

PUs 102 may represent corresponding VR mode-specific circuits. Alternatively, or additionally, multiple PUs 102 may represent corresponding configurations, or VR modes, of a configurable circuit such as described below with reference to FIGS. through 15.

At least some of PUs 102 may be represent circuit topologies or VR modes that differ from one another. Example PU circuit topologies, or VR modes are described in examples below. PU topologies and VR modes are not, however, limited to examples provided herein.

At least some of PUs 102 may have operating characteristics or features that differ from one another, and controller 104 may be implemented to select from amongst PUs 102 based the corresponding characteristics and reference 110.

For example, each PU 102 may be associated with a corresponding voltage range, and controller 104 may be implemented to select a PU for which the associated voltage range includes target voltage indicated by reference 110.

The voltage ranges associated with PUs 102 may be based on characteristics such as operating efficiencies and/or controllability within the associated voltage ranges.

Figure 2:
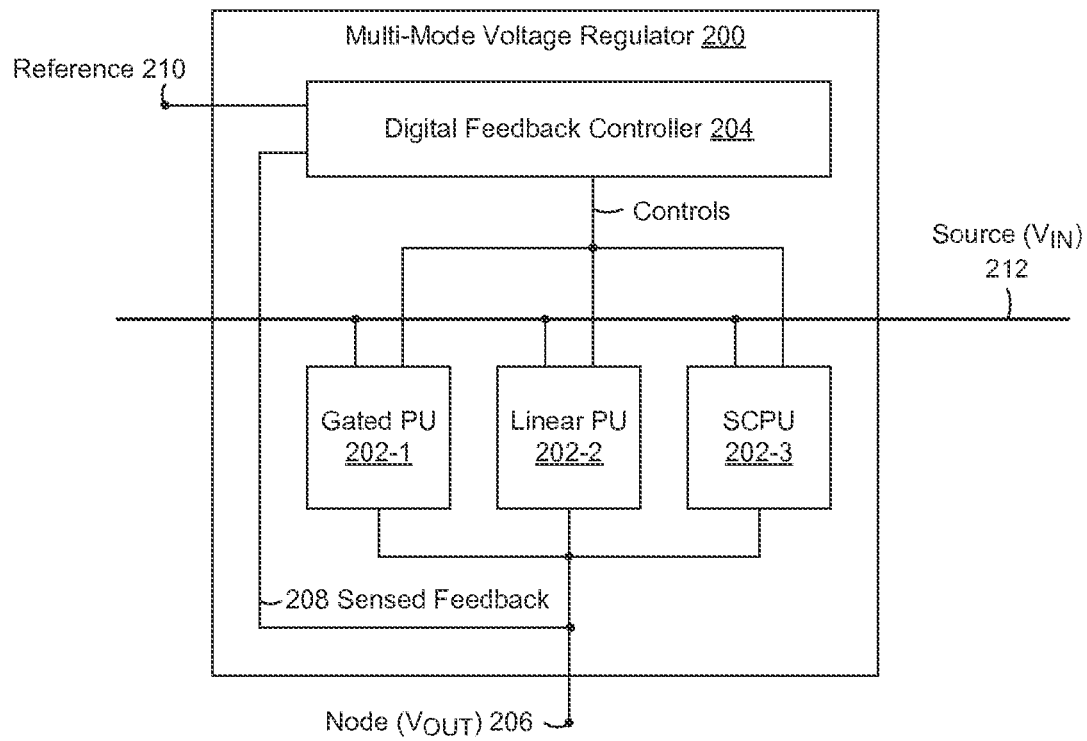
FIG. 2 is a block diagram of a VR including a gated PU, a linear PU, and switched-capacitor PU (SWPU), and a feedback controller.

PUs 102 may include, for example and without limitation, one or more of a gated or power gate-based PU, a switched-capacitor PU, a linear PU, and/or combinations thereof FIG. 2 is a block diagram of a VR 200 including a gated PU 202-1, a linear PU 202-2, and switched-capacitor PU (SCPU) 202-3. VR 200 further includes a feedback controller 204 to select, configure, and/or control PUs 202 to regulate VOUT at a node 206 based on a sensed feedback 208 and a reference 210.

Gated PU 202-1 may include multiple gates or switches to couple source 212 to node 206 in parallel with one another. Each gate may include one or more power devices, or power gates, such as one or more transistors sized to provide relatively high current with relatively low loss.

When enabled, a gate may present a relatively small inherent resistance between source 212 and node 206. As more gates are enabled, the resistance may be reduced due to the parallel configuration of the gates. The resistance may directly impact a voltage drop across gated PU 202-1, such that VOUT may be substantially equal to a difference between VIN at source 212 and the voltage drop over gated PU 202-1.

Controller 204 may be implemented to control and/or adjust the number of gates that are enabled to control the resistance and thus regulate VOUT. This may be referred to as modulating the number of enabled gates.

When a relatively substantial number of the gates are enabled, the resistance of gated PU 202-1 may be relatively low and VOUT at node 206 may be substantially equal to VIN at source 212. In this situation, gated PU 202-1 is relatively efficient, and may be more efficient than other PUs, such as linear PU 202-2 and/or SCPU 202-3. Feedback controller 204 may thus be implemented to select gated PU 202-1 when reference 210 represents a target voltage that is near VIN, and/or when a load at node 206 is at a maximum.

Selection of gated PU 202-1 may be referred to as a high-performance mode, or a turbo mode.

A control loop may be defined within VR 200 to include controller 204, PU 202-1, and sensed feedback 208. A loop bandwidth may be determined by a clock frequency applied to controller 204. Controller 204 may include a digitally-controlled oscillator to generate the clock frequency, which may provide a higher frequency than a system clock of a corresponding IC die. The oscillator may include a digitally-controllable multi-phase ring oscillator such as described further below.

Linear PU 202-2 may include one or more power devices to provide power to node 206 within a linear range of the device(s). Linear PU 202-2 may further include an operational amplifier (OpAmp) to control the linear device(s) based on a difference between sensed feedback 208 and reference 210. The differential amplifier may be disabled when linear PU 302-1 is not selected, which may conserve power. Linear PU 202-2 may include a low-dropout (LDO) VR.

Controller 204 may be implemented to control SCPU 202-3 as a switched-capacitor VR (SCVR). For example, SCPU 202-3 may include multiple selectable voltage conversion modes, and controller 204 may be implemented to select one of the multiple voltage conversion modes based on reference 210.

SCPU 202-3 may include multiple banks of switched-capacitor circuits, which may be implemented in accordance with one or more of a variety of conventional SC topologies. SCPU 202-3 may be configured and/or configurable for SC modes of, for example, 1:¾, 1:⅔, and 1:½. SCPU 402-3 is not, however, limited to these examples.

Controller 204 may be implemented to control SCPU 203-3 as a switched-capacitor VR (SCVR). Controller 204 may include a digitally-controllable oscillator to provide multiple clock phases to SCPU 202-3, and may be implemented to control the oscillator to minimize a difference between reference 210 and sensed feedback 208.

Linear PU 202-2 may have a relatively high efficiency at mid-range voltages, while SCPU 202-3 may provide greater efficiency at lower voltages. As described above, controller 400 may be implemented to select gated PU 202-1 when reference 210 corresponds to a relatively high target voltage for VOUT. Controller 202 may be further implemented to select linear PU 202-2 to regulate VOUT when reference 210 corresponds to a mid-range target voltage, and to select SCPU 202-3 when reference 210 corresponds to lower target voltage.

Alternatively, SCPU 202-3 may be configurable to operate in a 1:1 mode for mid-range voltages, and linear PU 202-2 may be omitted.

In FIG. 1, VR 100 may include a hybrid PU, which may be configurable and/or controllable to operate in one of multiple selectable VR modes such as described below with reference to FIGS. 3 through 15.

Figure 3:
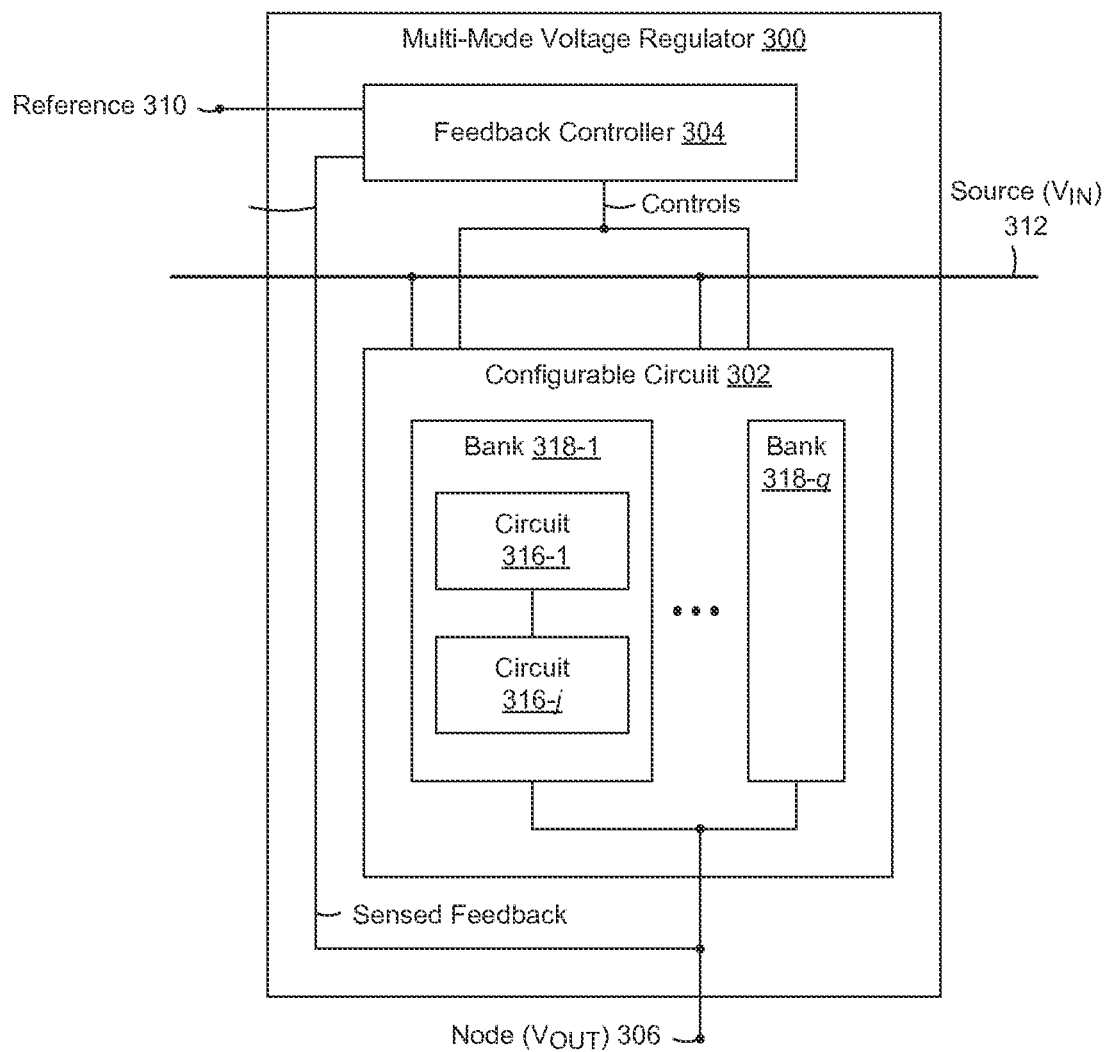
FIG. 3 is a block diagram of a VR including a feedback controller to configure a circuit in accordance with one of multiple selectable VR modes.

FIG. 3 is a block diagram of a multi-mode VR 300, including a feedback controller 304 to configure and/or control a circuit 302 in accordance with one of multiple selectable VR topologies or modes. VR 300 may further include one or more VR mode-specific PU units such as described in one or more examples above.

Circuit 302 may include multiple individually configurable circuits 316, which may be arranged and/or configurable as one or more banks of circuits 318. Circuits 316 may be substantially similar to one another. Alternatively, or additionally, one or more circuits 316 may differ from one or more other ones of circuits 316. One or more circuits 316 may be implemented as described below with reference to FIG. 4.

Figure 4:
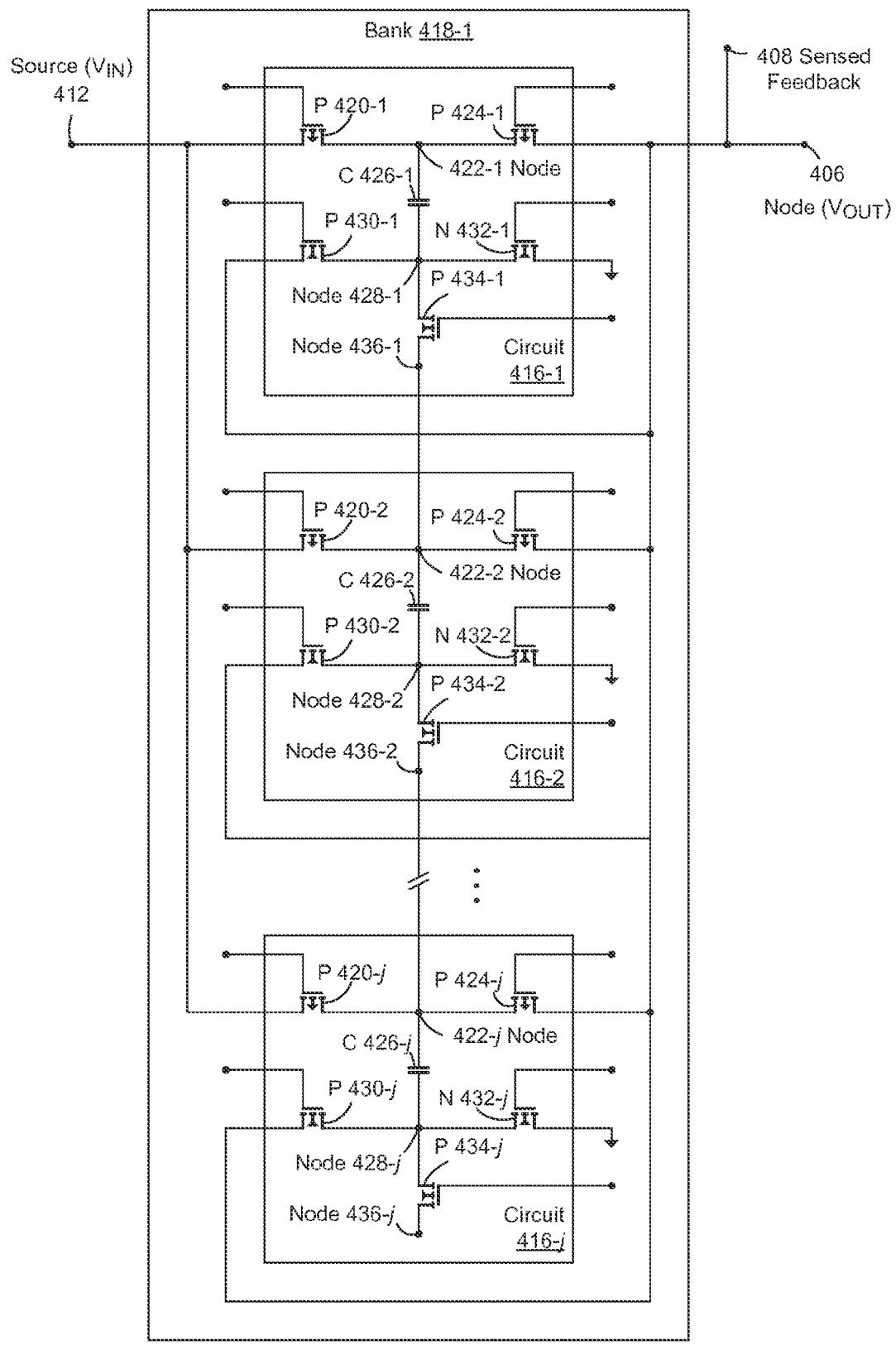
FIG. 4 is a circuit diagram of a bank of configurable circuits.

FIG. 4 is a circuit diagram of a bank 418 of configurable circuits 416-1 through 416-j.

Circuit 416-1 includes a first P-type device 420-1, controllable to couple a source 412 to a first node 422-1, and a second P-type device 424-1, controllable to couple first node 422-1 to an output node 406. Source 412 may correspond to one or more of sources 112, 212, and 312 in respective ones of FIGS. 1, 2, and 3. Output node 406 may correspond to one or more of nodes 106, 206, and 306 in respective ones of FIGS. 1, 2, and 3.

Circuit 416-1 further includes a capacitor 426-1 coupled to first node 422-1 and to a second node 428-1.

Circuit 416-1 further includes a P-type device 430-1, controllable to couple output node 406 to second node 428-1.

Circuit 416-1 further includes an N-type device 432-1, controllable to couple second node 428-1 to ground or a low logic state.

Circuit 416-1 further includes a P-type device 434-1, controllable to couple second node 428-1 to a third node 436-1, which may correspond to a first node 422-2 of a second circuit 416-2.

In the example of FIG. 4, circuits 416-2 through 416-j are implemented as described above with reference to 416-1.

In FIG. 4, one or more of devices 420, 424, 430, 432, and 434, and capacitor 426, may represent multiple such devices, which may be implemented in parallel and/or in series with one another.

Capacitors 426 may each include one or more relatively high-density on-die capacitors.

In FIG. 3, feedback controller 304 may be implemented to control gate terminals of devices 420, 424, 430, 432, and 434 of each circuit 416 to configure the circuits in accordance with one of multiple selectable VR modes, such as described below with reference to one or more of FIGS. 5 through 15.

Figure 5:
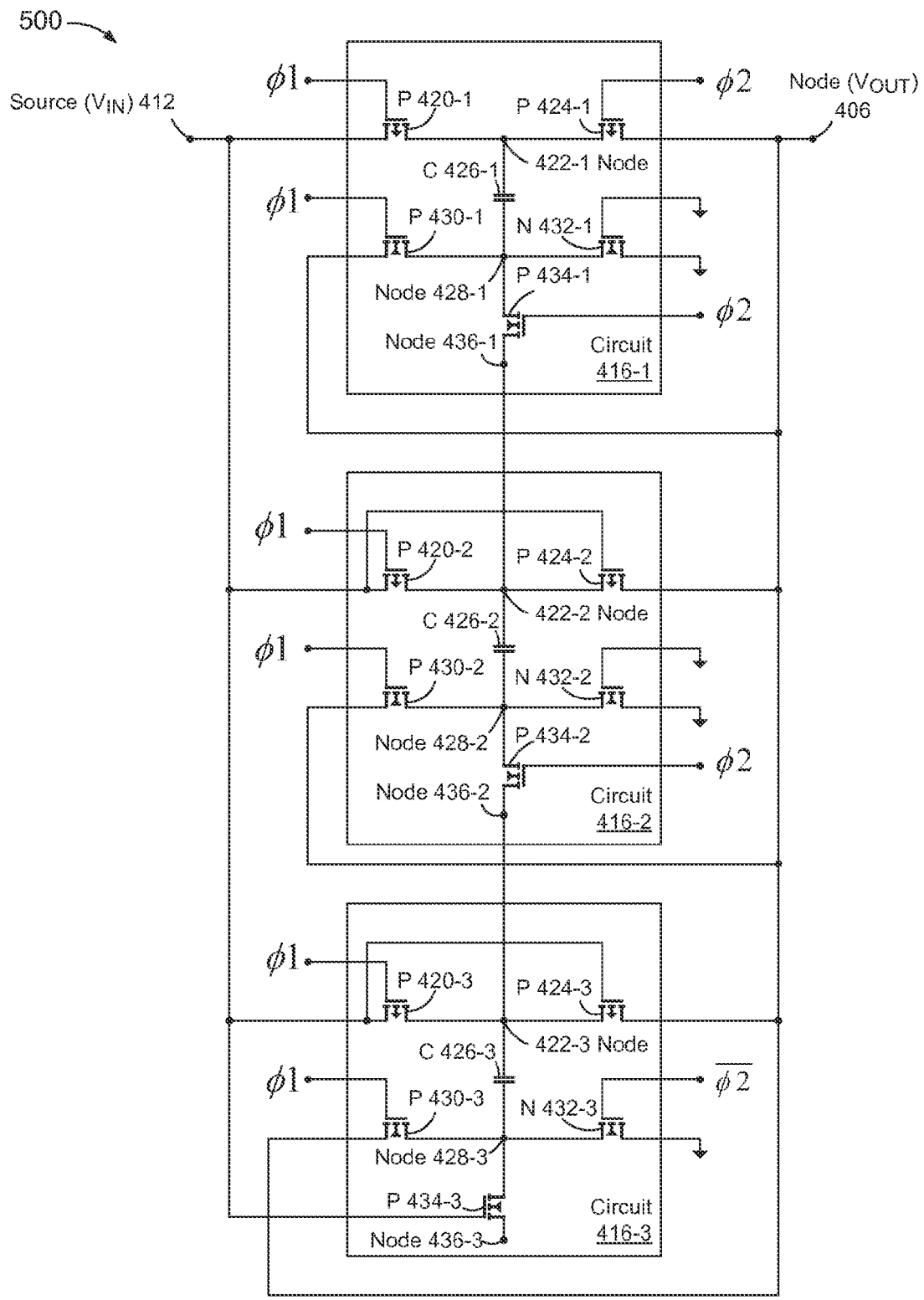
FIG. 5 is a diagram of circuits of FIG. 4, configured as a switched-capacitor (SC) bank in accordance with an SCVR mode of 1:¾.

FIG. 5 is a diagram of circuits 416-1, 416-2, and 416-3 configured as a switched-capacitor bank 500 to regulate VOUT at node 406 in accordance with an SCVR mode of 1:¾.

Bank 500 may be provided with first and second clock phases, φ1 and φ2, respectively, and an inverted version of phase φ2, illustrated here as $\overline{\varphi 2}$. Phases $\overline{\varphi 1}$ and φ2 may be generated such that they are not both low at the same time.

One or more additional banks of circuits 416 may be configured similarly to bank 500, and each additional bank may be provided with a corresponding set of phases, which may differ from phases φ1 and φ2. Such a configuration may be referred to as a multi-phase SCVR.

Figure 6:
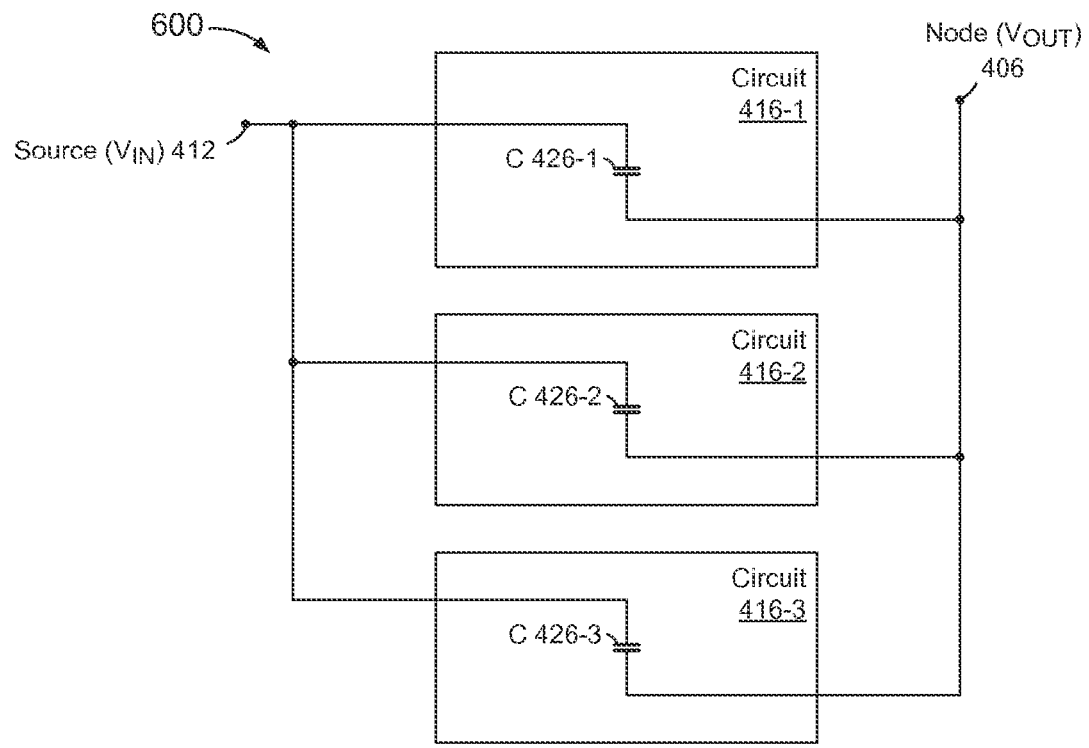
FIG. 6 is a diagram of an equivalent circuit of FIG. 5 when a phase φ1 is low and a phase φ2 is high.

FIG. 6 is an equivalent circuit diagram 600 of bank 500 when phase φ1 is low and phase φ2 is high, referred to herein as phase 1. As illustrated in FIG. 6, during phase 1, capacitors 426 of circuit 416-1, 416-2, and 416-3 are parallel-coupled between source 412 and node 408 to charge each capacitor 426 based on a difference between VIN and VOUT.

Figure 7:
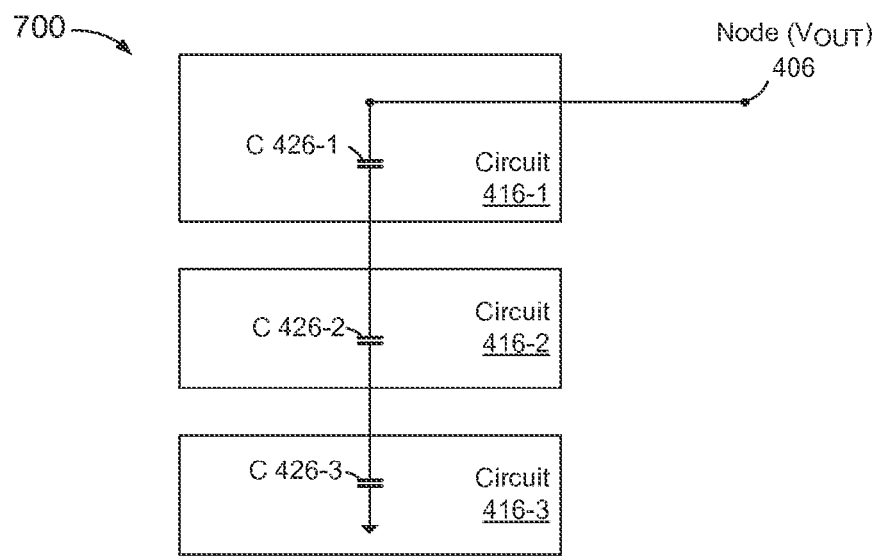
FIG. 7 is a diagram of an equivalent circuit of FIG. 5 when phase φ2 is low and phase φ1 is high.

FIG. 7 is an equivalent circuit diagram 700 of bank 500 when phase φ2 is low and phase φ1 is high, referred to herein as phase 2. As illustrated in FIG. 7, during phase 2, capacitors 426 of circuit 416-1, 416-2, and 416-3 are series-coupled between node 408 and ground to provide charge from series-coupled capacitors 426 to node 406.

Figure 8:
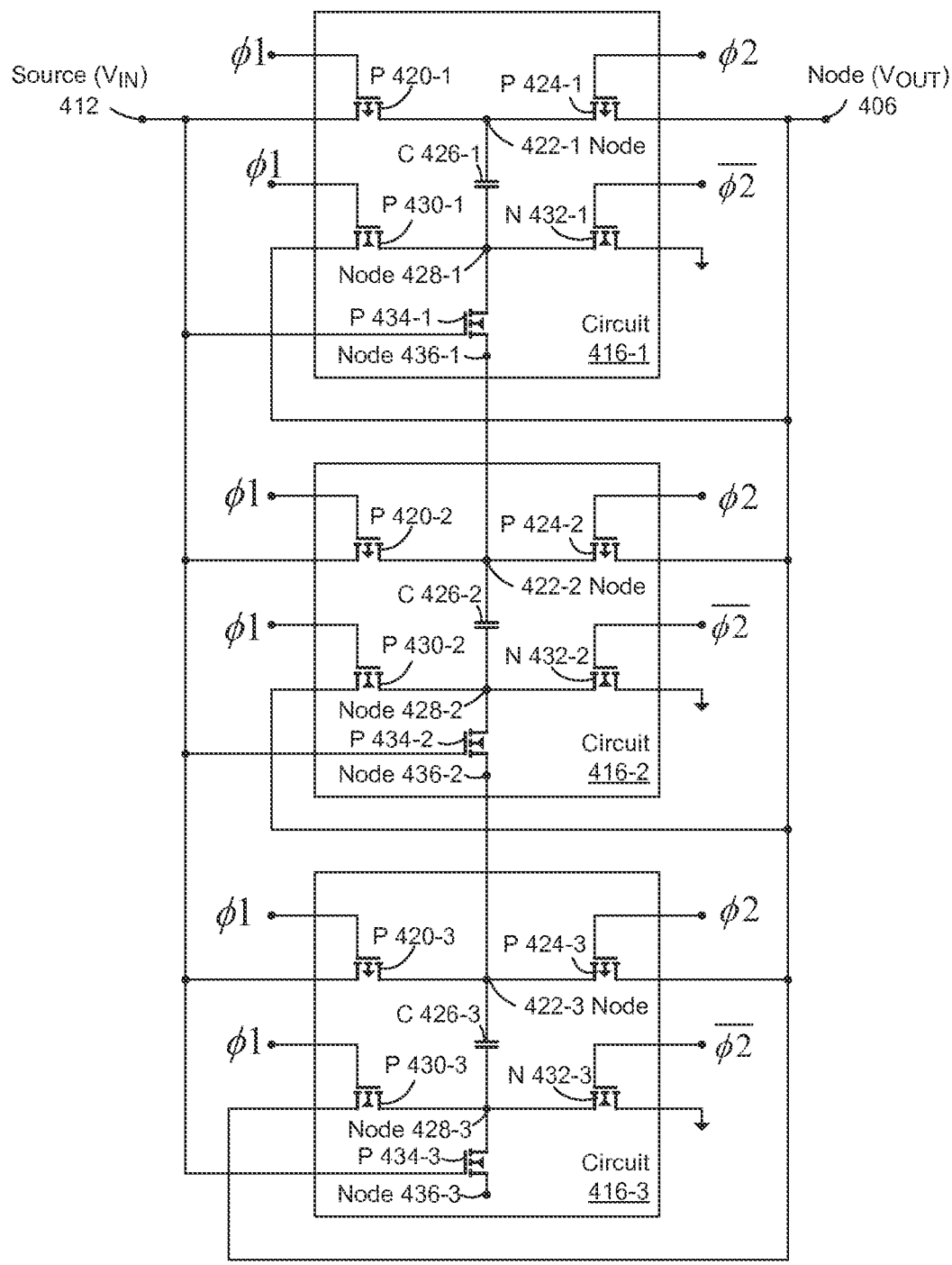
FIG. 8 is a diagram of circuits of FIG. 4 configured as a Sc bank in accordance with an SCVR mode of 1:½.

FIG. 8 is a diagram of circuits 416-1, 416-2, and 416-3, configured as a switched-capacitor bank 800 to regulate VOUT at node 460 in accordance with an SCVR mode of 1:½.

Bank 800 may be provided with first and second phases, φ1 and φ2, respectively, and an inverted version of phase φ2, illustrated here as $\overline{\varphi 2}$. Phases φ1 and φ2 may be generated such that they are not both low at the same time. Phases φ1 and φ2 in FIG. 8 may be the same or different than phases φ1 and φ2 in FIG. 5.

One or more additional banks of circuits 416 may be configured similarly to bank 800, such as described above with reference to bank 500.

Figure 9:
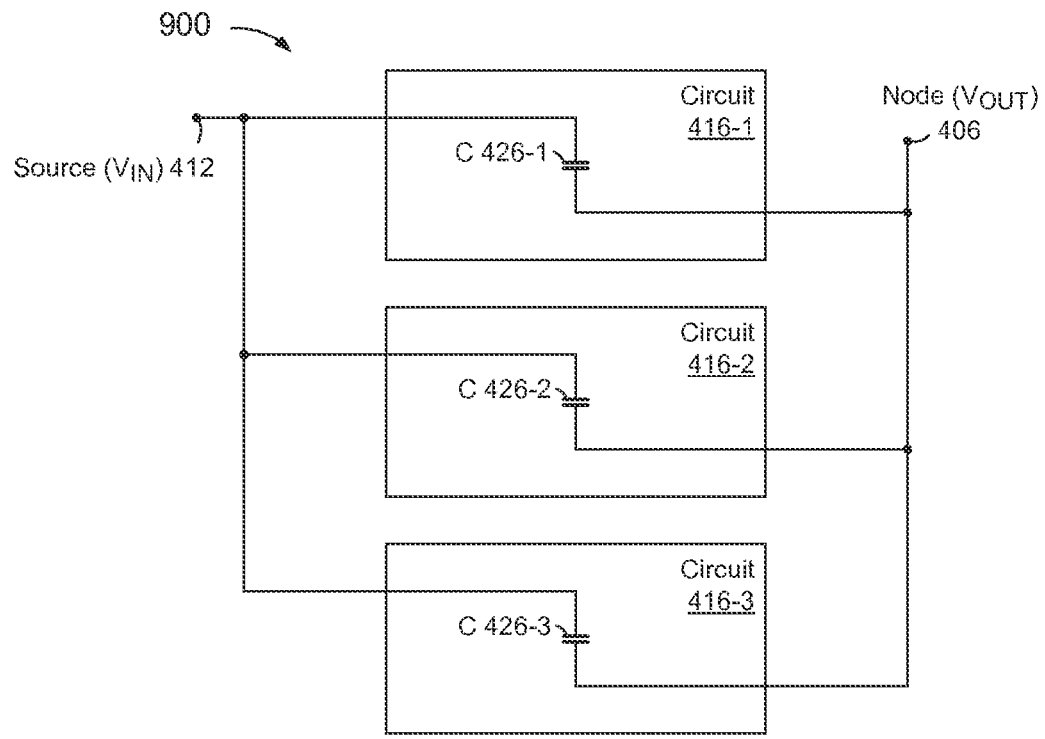
FIG. 9 is a diagram of an equivalent circuit of FIG. 8 when a phase φ1 is low and a phase φ2 is high.

FIG. 9 is an equivalent circuit diagram 900 of bank 800 when phase φ1 is low and phase φ2 is high, referred to herein as phase 1. As illustrated in FIG. 9, during phase 1, capacitors 426 of circuit 416-1, 416-2, and 416-3, are parallel-coupled between source 412 and node 408 to charge each capacitor 426 based on a difference between VIN and VOUT.

Figure 10:
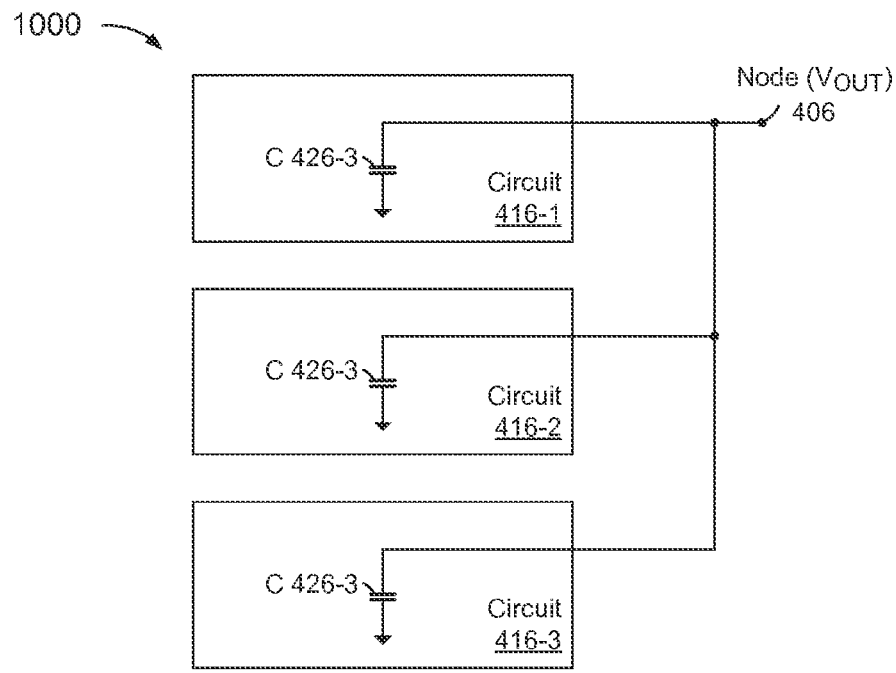
FIG. 10 is a diagram of an equivalent circuit of FIG. 8 when phase φ2 is low and phase φ1 is high.

FIG. 10 is an equivalent circuit diagram 1000 of bank 800 when phase φ2 is low and phase φ1 is high, referred to herein as phase 2. As illustrated in FIG. 10, during phase 2, capacitors 426 of circuit 416-1, 416-2, and 416-3, are effectively parallel-coupled between node 406 and ground.

Figure 11A:
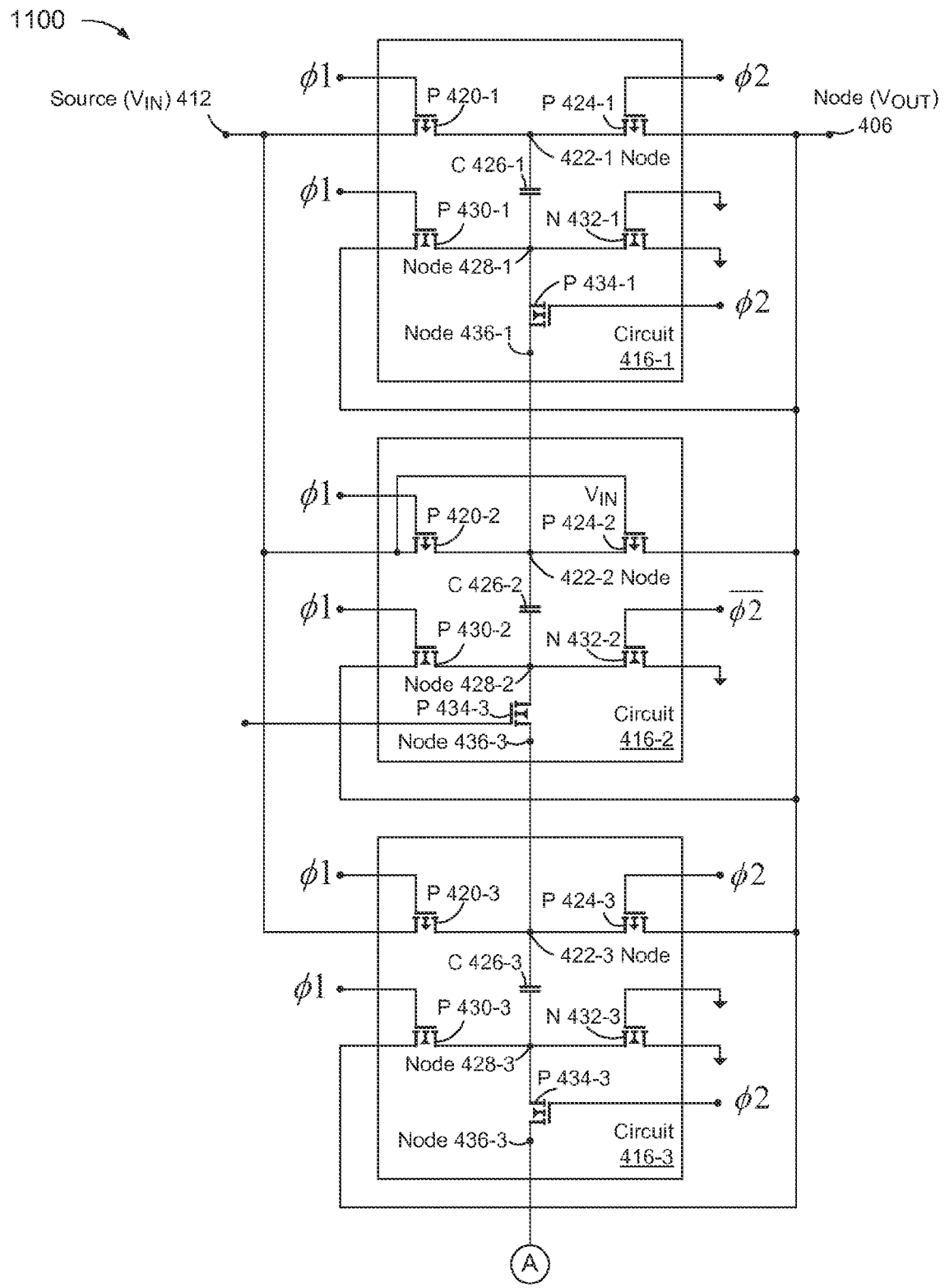
FIGS. 11A and 11B are diagrams of circuits of FIG. 4 configured as a SC bank in accordance with an SCVR mode of 1:⅔.
Figure 11B:
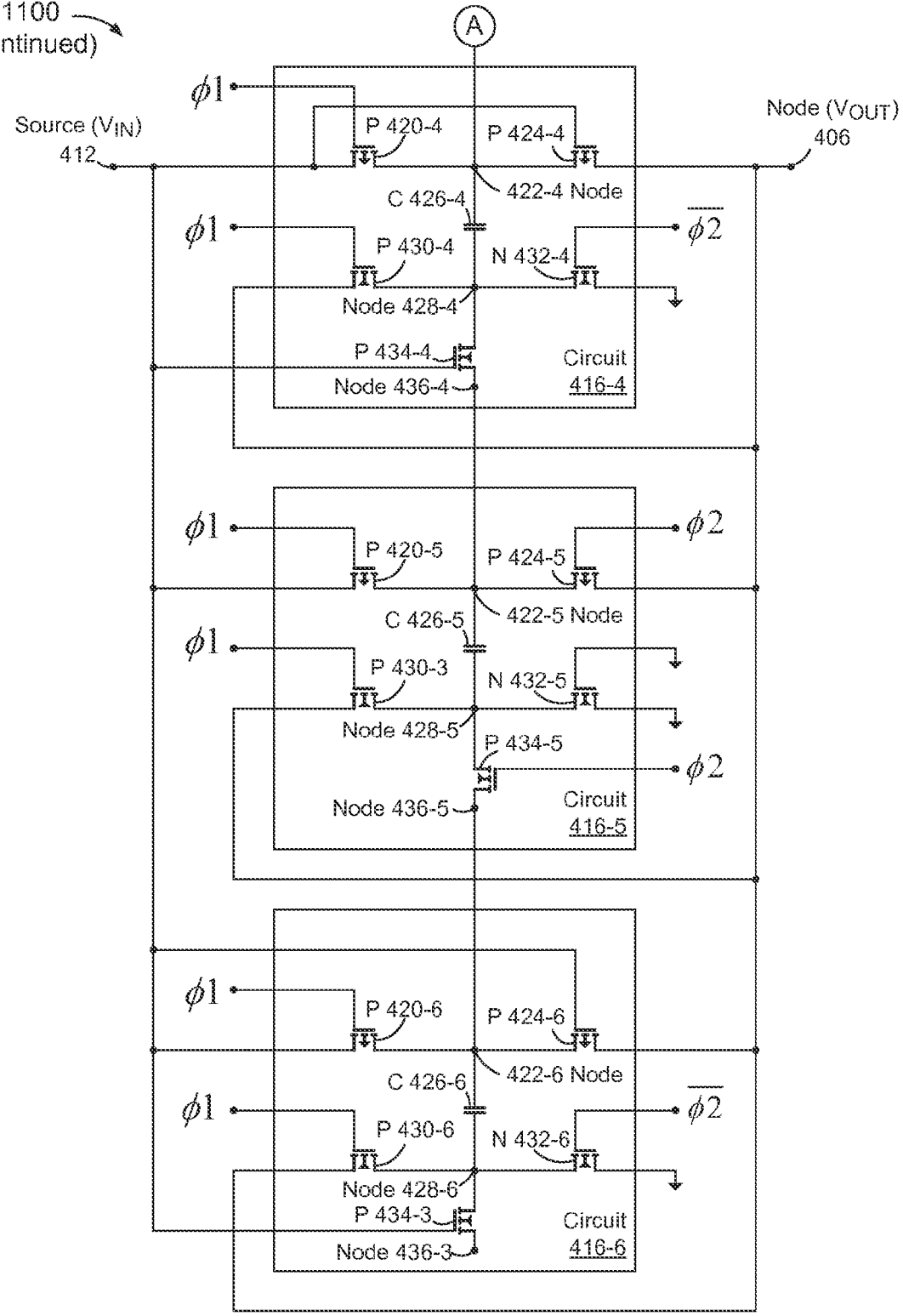

FIGS. 11A and 11B are diagrams of circuits 416-1 through 416-6, configured as a switched-capacitor bank 1100 to regulate VOUT at node 406 in accordance with an SCVR mode of 1:⅔.

Bank 1100 may be provided with first and second phases, φ1 and φ2, respectively, and an inverted version of phase φ2, illustrated here as $\overline{\varphi 2}$. Phases φ1 and φ2 may be generated such that they are not both low at the same time. Phases φ1 and φ2 in FIGS. 11A and 11B may be the same or different than phases φ1 and φ2 illustrated in FIGS. 5 and 8.

One or more additional banks of circuits 416 may be configured similarly to bank 1100, such as described above with reference to bank 500.

Equivalent circuits for bank 1100 during phases 1 and 2 may be readily ascertained based on an understanding of FIGS. 5 through 10.

Figure 12:
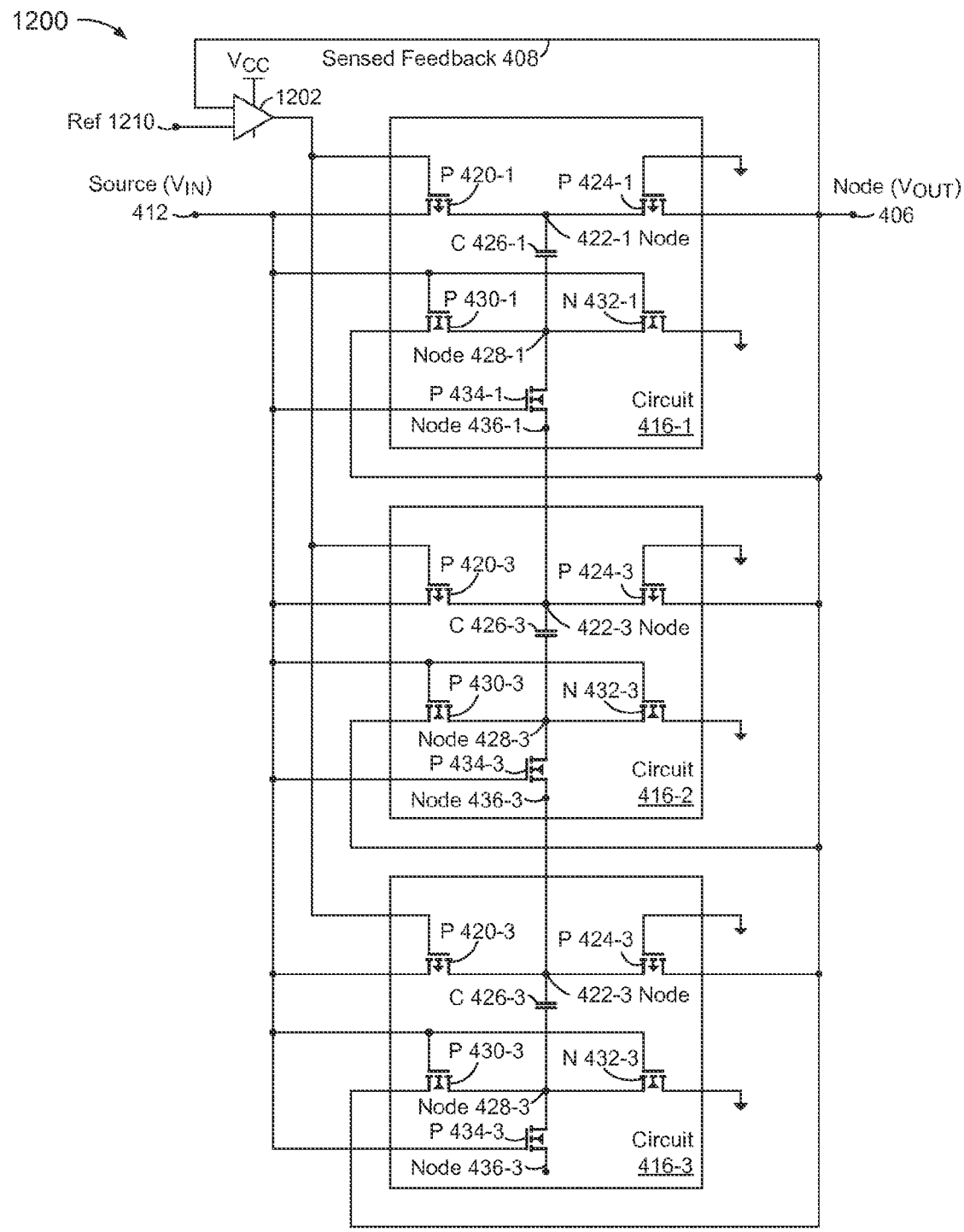
FIG. 12 is a diagram of circuits of FIG. 4, further including an operational amplifier, and configured as low drop-out VR (LDO VR).

FIG. 12 is a diagram of circuits 416-1, 416-2, and 416-3, including an operational amplifier (OpAmp) 1202, configured as a LDO VR 1200. One or more additional banks of circuits 416 may be configured as one or more additional LDO VRs.

Figure 13:
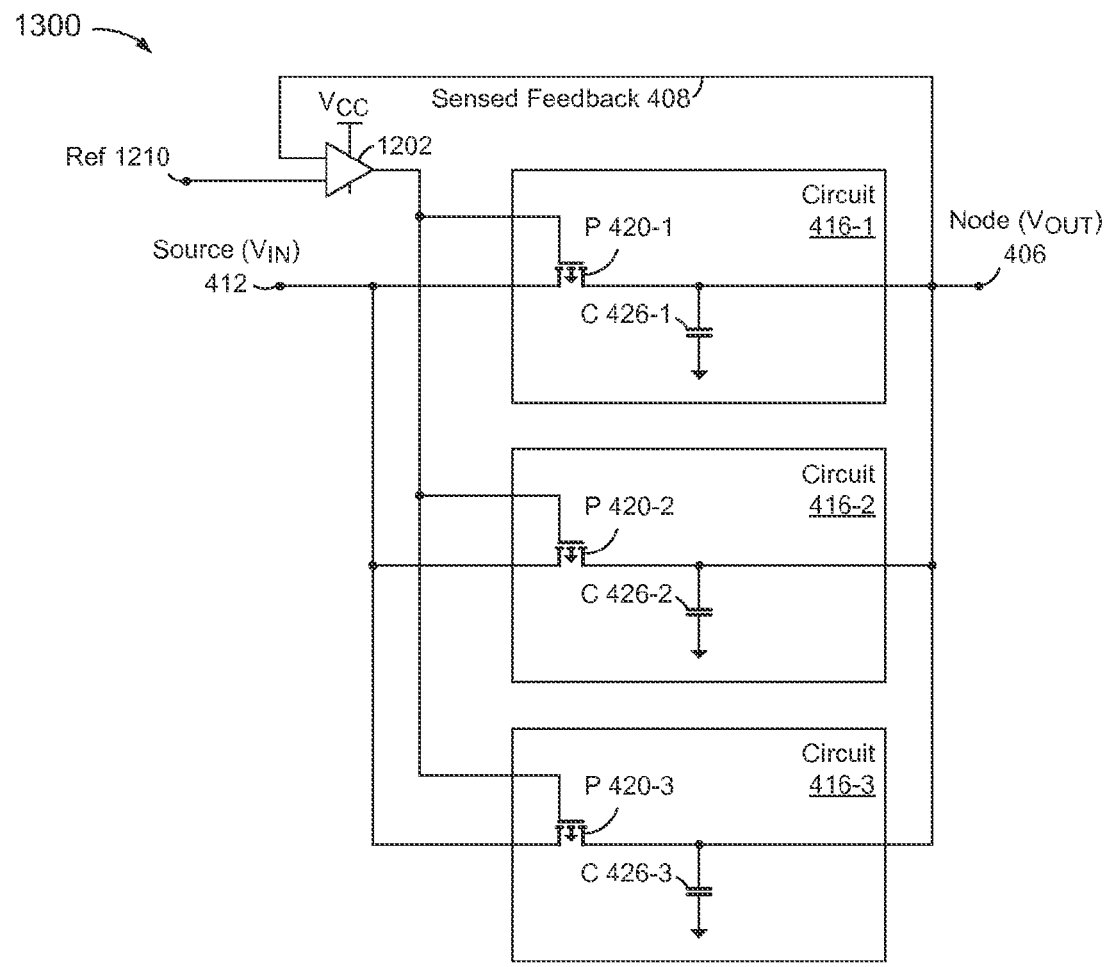
FIG. 13 is a diagram of an equivalent circuit of FIG. 12.

FIG. 13 an equivalent circuit diagram 1300 of LDO VR 1200.

In FIGS. 12 and 13, OpAmp 1202 is configured to control devices 420 based on a difference between sensed feedback 408 and a reference 1210. Devices 420 may be controlled to provide charge from source 412 to node 406 within a linear range of devices 420.

Figure 14:
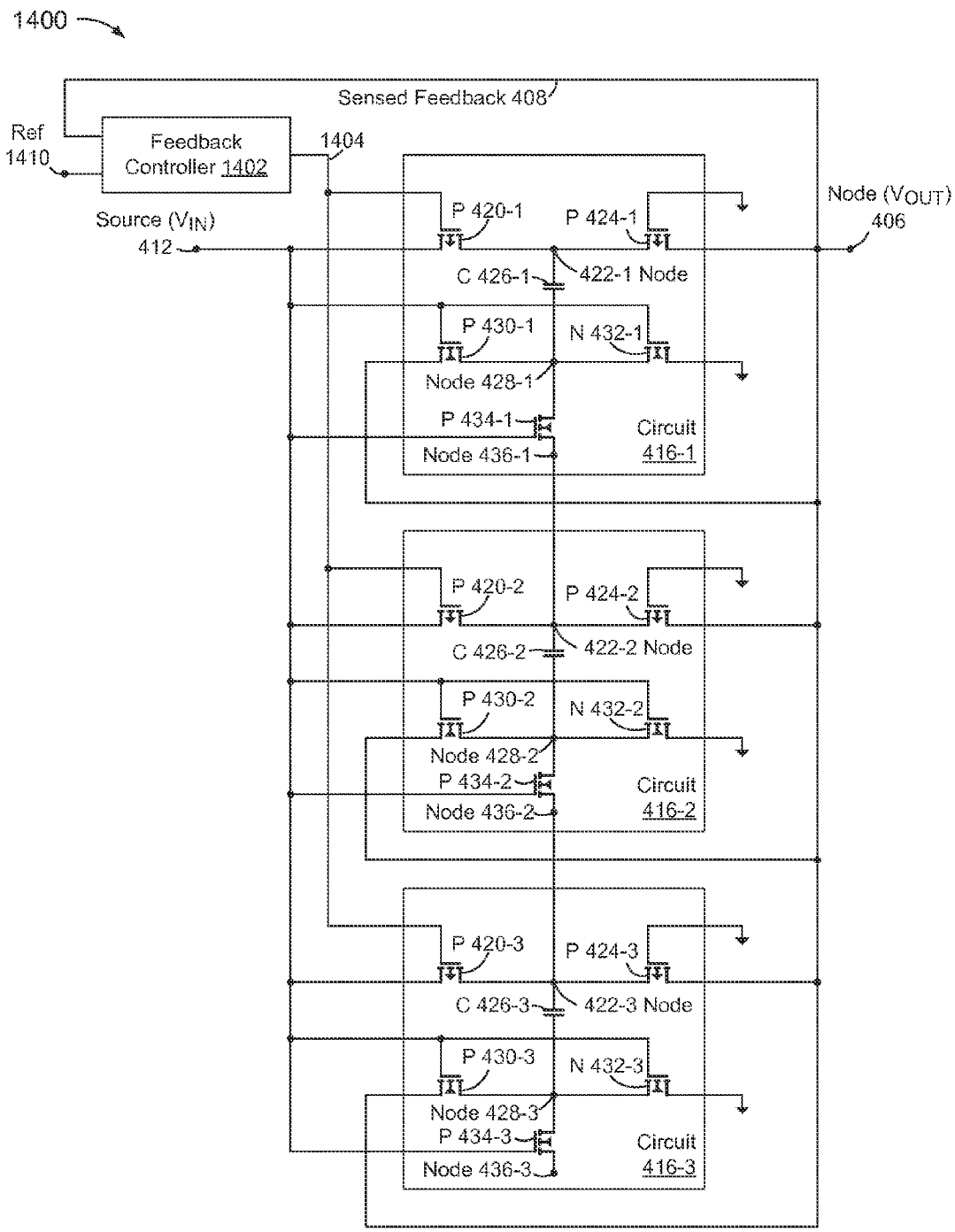
FIG. 14 is a diagram of circuits of FIG. 4 configured as a gated VR.

FIG. 14 is a diagram of circuits 416-1, 416-2, and 416-3, configured as a gated VR 1400.

Figure 15:
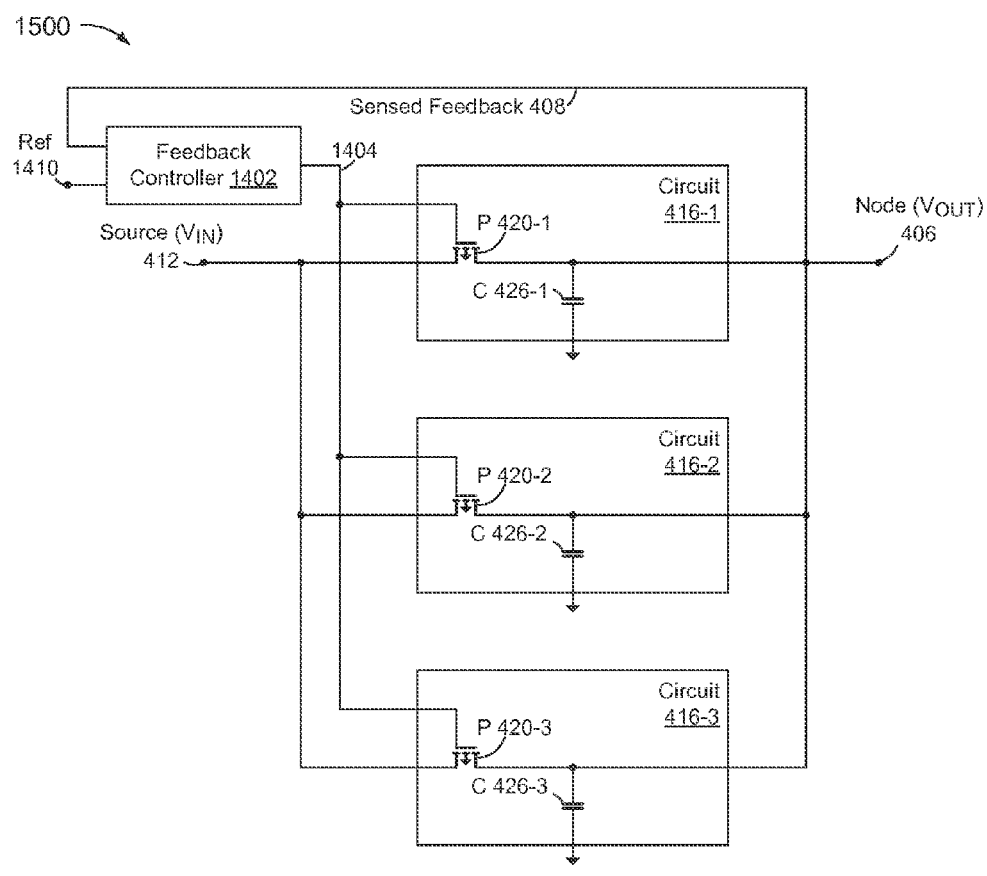
FIG. 15 is a diagram of an equivalent circuit of FIG. 14.

FIG. 15 is an equivalent circuit diagram 1500 of gated VR 1400.

In FIGS. 14 and 15, devices 420 are operated as switches to couple source 412 to node 406. A feedback controller 1402 may be implemented to provide a separate enable control 1404 to each of devices 420. Alternatively, or additionally, multiple banks of circuits 416 may each be configured as illustrated in FIG. 14, and feedback controller 1402 may be implemented to provide a corresponding enable control to each bank to selectively enable and disable all devices 420 of a given bank, on a per-bank basis.

Feedback controller 1402 may correspond to one or more of controller 104 (FIG. 1), controller 204 (FIG. 2), and controller 304 (FIG. 3).

In examples above, SCVR 500, SCVR 800, LDO VR 1200, and gated VR 1400 are each configured with 3 circuits 416, and SCVR 1100 is configured with 6 circuits 416. Methods and systems disclosed herein are not limited to these examples.

In FIG. 3, controller 304 may be implemented to transition between VR modes, such as to minimize disturbances on VOUT at node 306. For example, controller 304 may initially configure each of multiple banks 318 in accordance with a first VR mode. Thereafter, a second VR mode may be selected based on a change in reference 310. During a transition period, controller 304 may re-configure a first subset of banks 318 in accordance with the second VR mode while maintaining a second subset of banks 318 configured in accordance with the first VR mode. Controller 304 may subsequently re-configure the second subset of banks 318 in accordance with the second VR mode to complete the transition. Controller 304 may include a state machine to mange transitions.

A feedback controller, such as described respect to one or more examples above, may be programmable for each of multiple VR modes such as described below with reference to FIG. 16.

Figure 16:
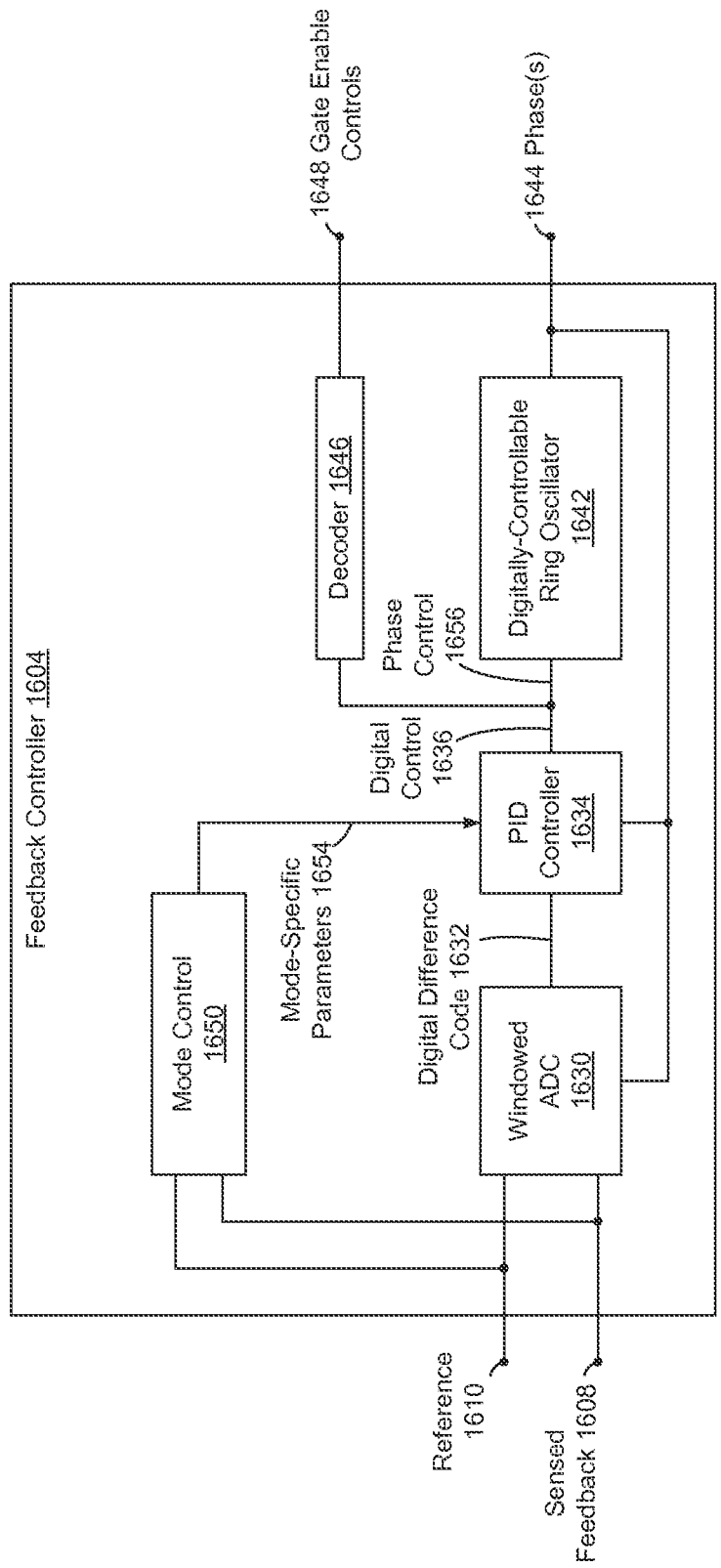
FIG. 16 is a block diagram of a feedback controller to regulate a voltage based on a reference voltage and sensed feedback voltage.

FIG. 16 is a block diagram of a feedback controller 1604, to control one or more VR modes to minimize a difference between a reference 1610 and a sensed feedback 1608.

Controller 1604 may include a flash analog-to-digital converter (flash ADC) 1630 to generate a digital difference code 1632 corresponding to a difference between sensed feedback 1608 and reference 1610. Flash ADC 1630 may be implemented as a windowed flash ADC to generate difference code 1632 with respect to a moving window of time.

Controller 1604 may include a proportional-integral-derivative (PID) controller 1634 to generate a digital control 1636 based on digital difference code 1632 and a selected VR mode. Controller 1604 is not, however, limited to a PID.

Controller 1604 include a mode control logic 1650, which may include mode-specific parameters 1654 for each of multiple VR modes, and PID controller 1634 may be programmed with a set of mode-specific parameters 1654 based on the selected VR mode. Mode-specific parameters 1654 may include PID filter coefficients.

Selectable VR modes may include, without limitation, one or more of a gated VR mode, a SCVR mode, and a LDO VR mode.

When a gated VR mode is selected, digital control 1636 may include a binary-weighted code indicative of a number of gates to be enabled. Controller 1604 may include a decoder 1646 to the convert binary-weighted code to gate enable controls 1648, which may correspond to enable control 1404 in FIGS. 12 and 13.

Controller 1604 may include a digitally-controllable oscillator, illustrated here as a ring oscillator, which may include a multi-phase ring oscillator, to provide clock phase(s) 1644.

When a SCVR mode is selected, phases 1644 or a subset thereof may be applied to SCVR circuitry, such as described above with reference to one or more of FIGS. 5, 8, 11A, and 11B. When the SCVR mode is selected, digital control 1636 may include a phase control 1656 to control the phases applied to the SCVR circuitry.

When a gated VR mode and/or a SCVR mode is selected, one or more of phases 1644 may be provided to digital error handling logic, such as ADC 1630 and/or PID controller 1634. This may be useful, for example, to provide a clock frequency that is higher than a system clock frequency available from circuitry external of controller 504.

Mode control logic 1650 may be implemented to select one of multiple VR modes based on a reference 1610 and voltage ranges associated with the VR modes.

Mode control logic 1650 may be implemented to configure circuitry for a selected VR mode such as described above with reference to one or more of FIGS. 3 through 15.

A multi-mode VR may be implemented to regulate a corresponding power domain of an integrated circuit die, such as described below with reference to FIG. 17.

Figure 17:
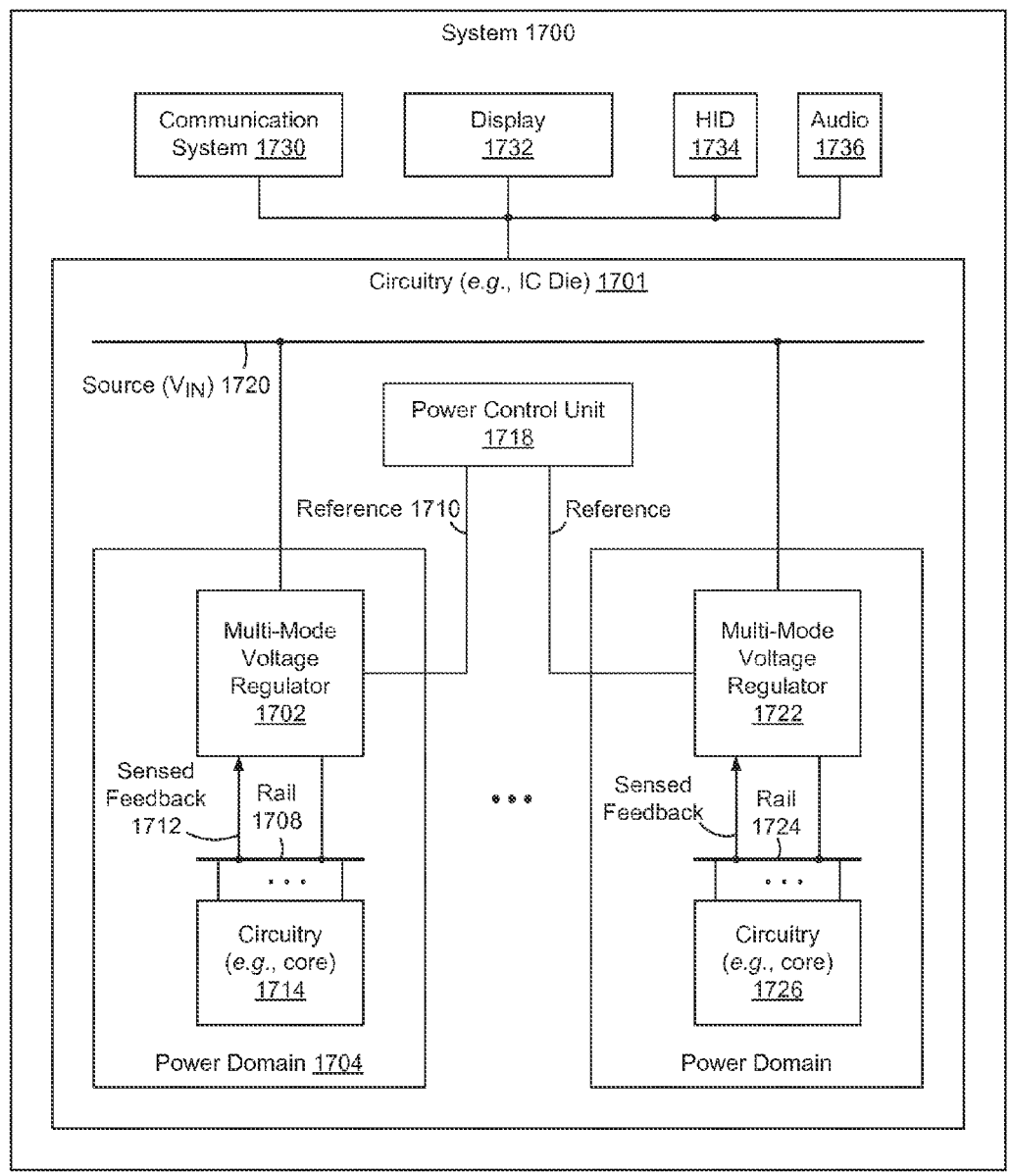
FIG. 17 is a block diagram of a system including a multi-mode VR to regulate a voltage of a power domain of an integrated circuit (IC).

FIG. 17 is a block diagram of a system 1700, including circuitry 1701 having a multi-mode VR 1702 to regulate a power domain 1704. Circuitry 1701 may correspond to one or more circuit boards, IC dies, or portions thereof.

VR 1702 may regulate a voltage of a rail 1708 in accordance with one of multiple selectable VR modes to reduce a difference between a reference 1710 and a sensed feedback voltage 1712, such as described with respect to one or more examples above.

System 1700 may include a power control unit (PCU) 1718 to provide reference 1710.

Circuitry 1701 may include circuitry 1714 to receive power from voltage rail 1708. The voltage at rail 1708 may be regulated to operate circuitry 1714 in a power-consumption state independent of power-consumption states of other circuitry of system 1700. This may permit more efficient use of available power.

System 1700 may include additional circuitry 1726 to receive power from a second rail 1724, and a second multi-mode VR 1722 to regulate rail 1724. This may permit operating states of circuitry 1714 and 1726 to be individually managed.

For example, circuitry 1714 and 1726 may each include a processor core, and rails 1708 and 1724 may be individually regulated, such as to permit one of the cores to be maintained in an active state or one of multiple power-consumption states, while the other processor core is in a reduced power-consumption state or a sleep state.

Similarly, operating states of multiple memory blocks and/or multiple execution units of a graphics partition may be individually managed.

System 1700 may further include a communication system 1730 to interface between circuitry 1701 and a communication network. Communication system 1730 may include a wired and/or wireless communication system.

System 1700 may further include a monitor or display 1732 to display information from circuitry 1701.

System 1700 may further include a human interface device (HID) 1734 to provide user input to circuitry 1701. HID 1734 may include, for example and without limitation, one or more of a key board, a cursor device, a touch-sensitive device, and or a motion and/or image sensor. HID 1734 may include a physical device and/or a virtual device, such as a monitor-displayed or virtual keyboard.

System 1700 may further include an audio system 1736 to provide an audible output from circuitry 1701 and/or communication system 1730.

System 1700 may include a housing to receive circuitry 1701, communication system 1730, display 1732, audio system 1736, and HID 1734 and/or an interface thereto. The housing may include, without limitation, a rack-mountable housing, a desk-top housing, a lap-top housing, a notebook housing, a net-book housing, a set-top box housing, a hand-held housing, and/or other conventional electronic housing and/or future-developed housing. System 1700 may correspond to, for example and without limitation, a computer system, a server system, and/or a hand-held processor and/or communication device. System 1700 may further include a battery system to provide a power source 1720.

Figure 18:
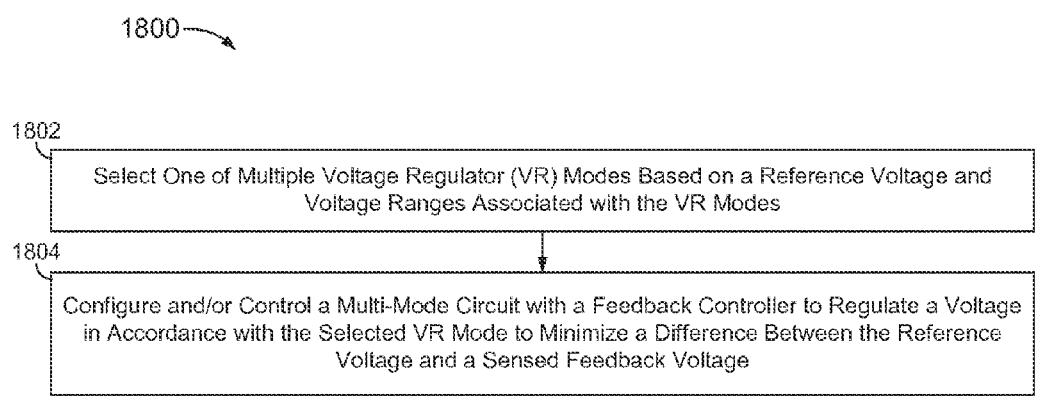
FIG. 18 is a flowchart of a method of controlling a multi-mode VR.

FIG. 18 is a flowchart of a method 1800 of controlling a multi-mode VR.

At 1802, one of multiple VR modes is selected. The VR mode may be selected based on a reference voltage and a voltage range associated with the selected VR mode, such as described in one or more examples above.

At 1804, a multi-mode VR circuit is controlled to regulate a voltage in accordance with the selected VR mode to minimize a difference between the reference voltage and a sensed feedback voltage, such as described in one or more examples above.

Figure 19:
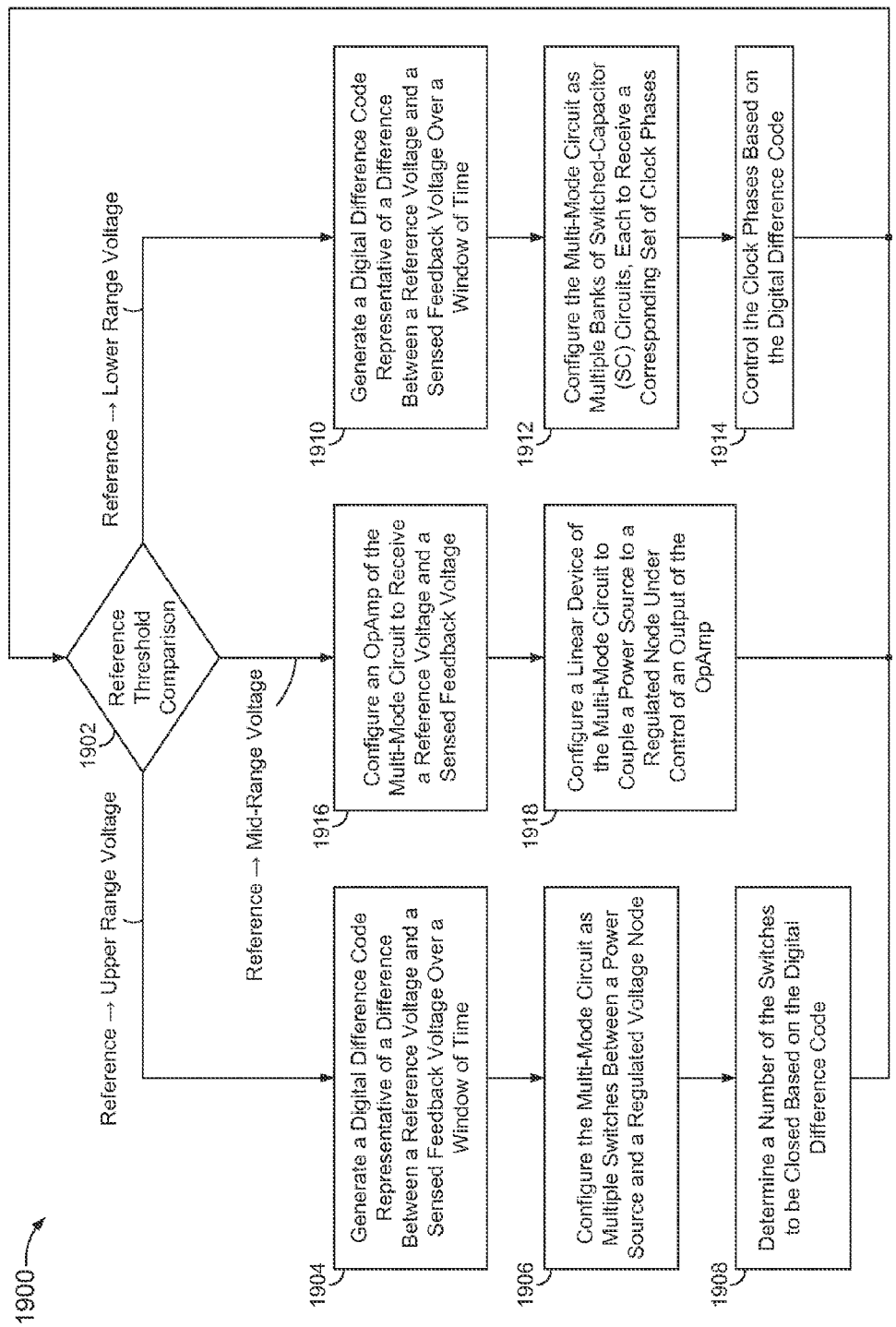
FIG. 19 is a flowchart of a method of controlling a multi-mode VR with respect to one or more of a gated VR mode, a SCVR mode, and a LDO VR mode.

FIG. 19 is a flowchart of a method 1900 of controlling a multi-mode VR in accordance with a selectable one of a gated VR mode, a SCVR mode, and a LDO VR mode.

At 1902, one of multiple VR modes is selected. The selecting may include comparing a reference voltage with one or more thresholds and/or threshold ranges associated with the multiple VR modes.

Where the reference voltage corresponds to an upper range voltage, processing may proceed to 1904.

At 1904, a digital difference code may be generated to represent a difference between the reference voltage and a sensed feedback voltage, such as described above with reference to windowed ADC 1630 in FIG. 16.

At 1906, a multi-mode circuit may be configured as multiple switches between a power source and a regulated voltage node, such as described above with reference to FIGS. 14 and 15.

At 1908, a number of the switches to be closed or enabled is determined and/or adjusted based on the digital difference code, such as described above with reference to FIG. 16.

Returning to 1902, where the reference voltage corresponds to a lower range voltage, processing may proceed to 1910.

At 1910, a digital difference code may be generated to represent a difference between the reference voltage and the sensed feedback voltage, such as described above with reference to 1904.

At 1912, the multi-mode circuit may be configured as multiple banks of a switched-capacitor VR (SCVR), such as described above with respect to one or more of FIGS. 5 through 11B.

At 1914, clock phases are provided to the SCVR and digitally controlled based on the digital difference code, such as described above with reference to FIG. 16.

Returning to 1902, where the multi-mode VR circuit is configurable as a low drop-out (LDO) VR, and where the reference voltage corresponds to a mid-range voltage, processing may proceed to 1916.

At 1916, an operational amplifier (OpAmp) of the multi-mode VR circuit may be configured to receive the reference voltage and the sensed feedback voltage.

At 1918, a device of the multi-mode VR circuit may be controlled by the OpAmp, within a linear range of the device, to transfer a regulated charge from the power source to the regulated voltage node, such as described above with reference to FIGS. 12 and 13.

Where the reference voltage changes, processing may switch at 1902 from one VR mode or branch of method 1900 to another VR mode or branch. The switch may be controlled to minimize disturbances at the regulated voltage node, such as described in one or more examples above.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a micro-controller, or other instruction-based processor.

Figure 20:
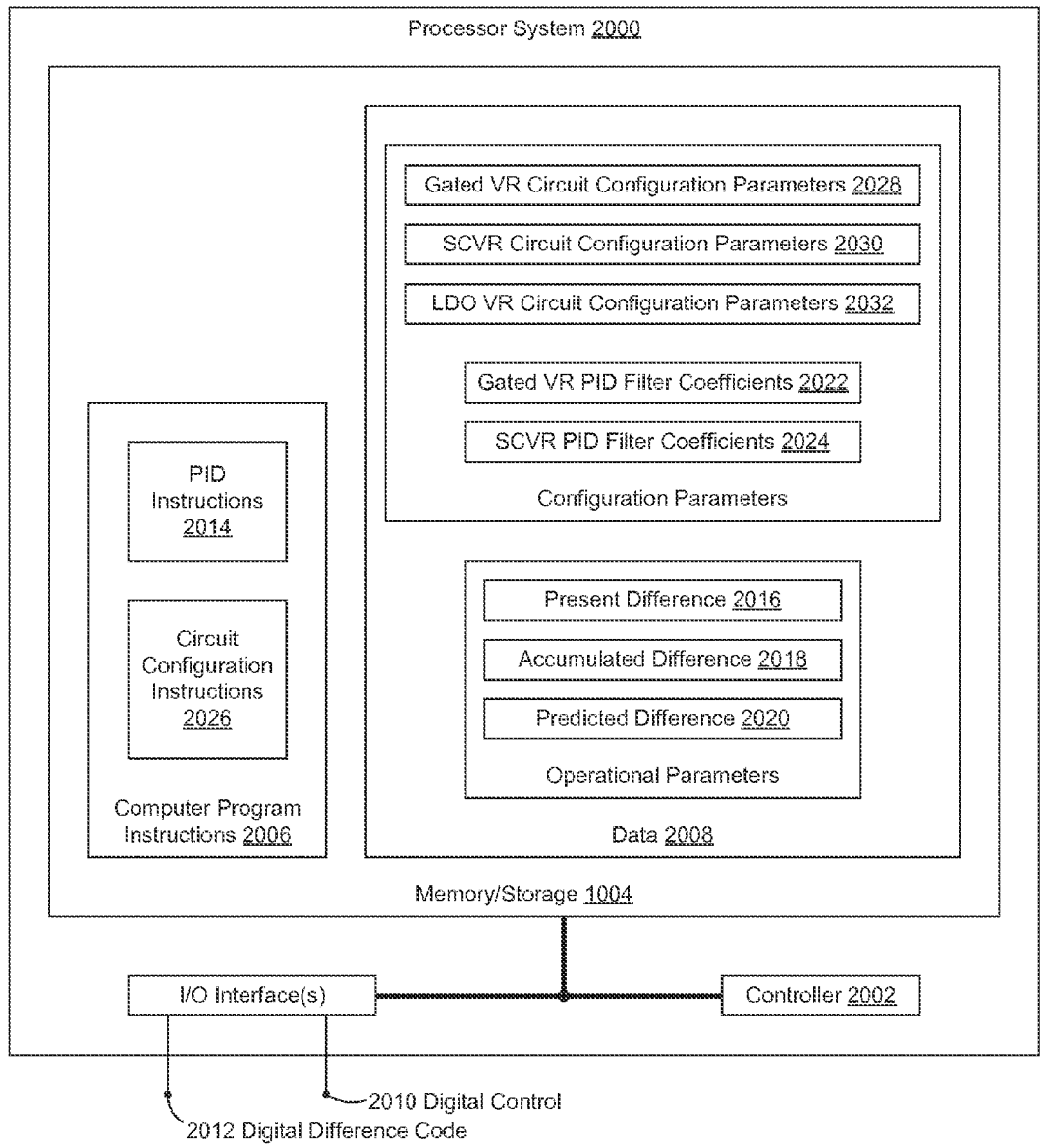
FIG. 20 is a block diagram of a processor system to implement multiple selectable VR modes.

FIG. 20 is a block diagram of a processor system 2000 configured as a multi-mode VR controller.

Processor system 2000 may be implemented to regulate a selected VR mode with a control 2010 based on a digital difference code 2012 and a selected VR mode. Control 2010 may correspond to digital control 1636 in FIG, and digital difference code 2012 may correspond to digital difference code 1632 in FIG. 16.

Processor system 2000 may include one or more instruction processing units, illustrated here as a controller 2002, which may include a processor, a processor core, or a micro-controller fabricated within an IC die of a multi-mode VR.

Computer system 2000 may include memory, cache, registers, and/or storage, illustrated here as memory 2004.

Memory 2004 may include a non-transitory computer readable medium encoded with a computer program, including instructions 2006 to be executed by controller 2002.

Instructions 2006 may be embedded within firmware to be copied to memory during runtime.

Memory 2004 may include data 2008 to be used by controller 2002 in executing instructions 2006, and/or generated by controller 2002 during execution of instructions 2006.

Instructions 2006 may include controller instructions 2014, described below as proportional-integral-derivative (PID) controller instructions. Controller instructions 2014 are not, however, limited to PID instructions.

PID instructions 2014 may include instructions to cause controller 2002 to generate control 2010 based on a weighted sum of difference code 2012, an accumulated value 2018 of difference code 2012, and a predicted future value 2020 of difference code 2012, or a subset thereof.

PID instructions 2014 may include PID configuration instructions to cause controller 2002 to generate control 2010 based on VR mode-specific filter coefficients, illustrated here as gated VR PID filter coefficients 2022 and SCVR PID filter coefficients 2024, such as described above with reference to FIG. 16.

Instructions 2006 may include circuit configuration instructions 2026 to cause controller 2002 to configure a multi-mode VR circuit in accordance with a selected one of multiple VR modes. Data 2008 may include circuit configuration parameters, which may include indications of switches to be opened and/or closed to configure a multi-mode VR circuit, such as described above with reference to one or more of FIGS. 3 through 15. In the example of FIG. 20, circuit configuration parameters include gated VR circuit configuration parameters 2028, SCVR circuit configuration parameters 2030, and LDO VR circuit configuration parameters 2032.

Circuit configuration instructions 2026 may include instructions to cause controller 2002 to select a VR mode based on a reference voltage, such as described in one or more examples above.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. An apparatus, comprising:
   first and second banks of voltage regulator circuits, wherein the first and second banks of voltage regulator circuits are operable as respective first and second banks of parallel gates to regulate resistance between a power source and a voltage rail, and as first and second switched-capacitor voltage regulators; and
   a controller configured to,
      operate the first and second banks of voltage regulator circuits as the respective first and second switched-capacitor voltage regulators when a reference voltage is within a first voltage range,
      operate the first bank of voltage regulator circuits as the first bank of parallel gates, including to determine a number of the gates to close, and operate the second bank of voltage regulator circuits as the second switched-capacitor voltage regulator, during a transition period that begins when the reference voltage transitions from the first voltage range to a second voltage range that is higher the first voltage range, and
      operate the first and second banks of voltage regulator circuits as the respective first and second banks of parallel gates after the transition period.

2. The apparatus of claim 1, wherein the controller is further configured to:
   operate the first bank of voltage regulator circuits as the first bank of parallel gates when a load of the voltage rail is at a maximum load level.

3. The apparatus of claim 1, wherein:
   the controller includes a digitally controllable multi-phase oscillator;
   the first bank of voltage regulator circuits is operable as multiple banks of switched-capacitor circuits, each to receive a corresponding set of clock phases from the multi-phase oscillator, when the reference voltage is within the first voltage range; and
   the controller is further configured to control the multi-phase oscillator based on a digital difference code indicative of a difference between the reference voltage and the first voltage rail, when the reference voltage is within the first voltage range.

4. The apparatus of claim 1, wherein:
   the first bank of voltage regulator circuits includes an operational amplifier to control the bank of parallel gates in a low drop-out mode to regulate charge flow between the power source and the voltage rail based on a difference between the reference voltage and the voltage rail; and
   the controller is further configured to operate the first bank of voltage regulator circuits in the low drop-out mode when the reference voltage is within a linear range of the bank of parallel gates.

5. The apparatus of claim 1, wherein:
   the first bank of voltage regulator circuits is further operable in multiple switched-capacitor voltage regulator modes, each to reduce a voltage of the power source by a respective one of multiple fractions; and
   the controller is further configured to operate the first bank of voltage regulator circuits in one of the switched-capacitor voltage regulator modes to regulate the voltage rail as the respective fraction of the voltage of the power source.

6. The apparatus of claim 5, wherein:
   the bank of voltage regulator circuits is operable in the multiple switched-capacitor voltage regulator modes to reduce the voltage of the power source by respective fractions of ¾, ⅔, and ½.

7. The apparatus of claim 1, wherein each voltage regulator circuit of the first bank of voltage regulator circuits includes a first transistor, a capacitive feature, and multiple configuration transistors, and wherein the controller is further configured to:
   control the configuration transistors to configure the first transistors as the bank of parallel gates when the reference voltage is within the first voltage range; and
   control the configuration transistors to configure the first transistors and the capacitive features as the switched-capacitor voltage regulator when the reference voltage is within the first voltage range.

8. The apparatus of claim 1, wherein the controller includes:
   a windowed flash analog-to-digital controller to output a digital difference code indicative of a difference between the reference voltage and the voltage rail;
   a digital controller to generate a digital control based on the digital difference code and the reference voltage; and
   a digitally-controllable multi-phase ring oscillator to generate one or more clock phases based on the digital control when the first bank of voltage regulator circuits is operated as the first switched-capacitor voltage regulator;
   wherein the controller is further configured to control the number of the gates to close with the digital code when the first bank of voltage regulator circuits is operated as the first bank of parallel gates.

9. A system, comprising, an integrated circuit die that includes a first on-die multi-mode voltage regulator to regulate a first voltage rail of the integrated circuit die based on a first reference voltage, wherein the first multi-mode voltage regulator includes:
   first and second banks of voltage regulator circuits, wherein the first and second banks of voltage regulator circuits are operable as respective first and second banks of parallel gates to regulate resistance between the first voltage rail and a power source of the integrated circuit die, and as respective first and second switched-capacitor voltage regulators; and
   a first controller configured to,
      operate the first and second banks of voltage regulator circuits as the respective first and second switched-capacitor voltage regulators when the first reference voltage is within a first voltage range;

operate the first bank of voltage regulator circuits as the first bank of parallel gates, including to determine a number of the gates to close, and operate the second bank of voltage regulator circuits as the second switched-capacitor voltage regulator, during a transition period that begins when the reference voltage transitions from the first voltage range to a second voltage range that is higher than the first voltage range, and operate the first and second banks of voltage regulator circuits as the respective first and second banks of parallel gates at an end of the transition period.

10. The system of claim 9, wherein the integrated circuit die further includes:

a second on-die multi-mode voltage regulator to regulate a second voltage rail of the integrated circuit die based on a second reference voltage; and a graphics processor;

wherein each of the first and second voltage rails is configured to provide electric power to a respective one or more of a core, a partition, and a memory block of the graphics processor.

11. The system of claim 9 or claim 10, wherein the integrated circuit die further includes a processor, the system further including:

a communication system to interface between the processor and a communication network;

a display to present information from the processor; and a human interface device (HID) to receive user input.

12. The system of claim 11, wherein the communication system includes a wireless communication system, the system further including:

a mobile hand-held housing to receive the IC die, the communication system, the display, and a battery to provide the power source.

13. A non-transitory computer readable medium encoded with a computer program that includes instructions to cause a controller to:

operate first and second banks of voltage regulator circuits as respective first and second switched-capacitor voltage regulators when a reference voltage is within a first voltage range;

operate the first bank of voltage regulator circuits as a first bank of parallel gates, including to determine a number of the gates to close, to regulate resistance between a power source and a the voltage rail, and operate the second bank of voltage regulator circuits as the second switched-capacitor voltage regulator, when the reference voltage is within a second voltage range that is higher than the first voltage range, and operate the first bank of voltage regulator circuits as the first bank of parallel gates and operate the second bank of voltage regulator circuits as a second bank of parallel gates, after the transition period switched-capacitor voltage regulator when the reference voltage is within a second voltage range that is below the first voltage range.

14. The non-transitory computer readable medium of claim 13, further including instructions to cause the controller to:

operate the first bank of voltage regulator circuits as the first bank of parallel gates when a load of the voltage rail is at a maximum load level.

15. The non-transitory computer readable medium of claim 13, further including instructions to cause the controller to:

operate the first bank of voltage regulator circuits in a low drop-out mode when the reference voltage is within a linear range of the bank of parallel gates to control the bank of parallel gates with an operational amplifier based on a difference between the reference voltage and the voltage rail to regulate charge flow between the power source and the voltage rail.

16. The non-transitory computer readable medium of claim 13, further including instructions to cause the controller to:

operate the first bank of voltage regulator circuits in one of multiple switched-capacitor voltage regulator modes to regulate the voltage rail as a respective one of multiple fractions of a voltage of the power source, when the reference voltage is within the first voltage range.

17. The non-transitory computer readable medium of claim 16, wherein the multiple switched-capacitor voltage regulator modes include fractional reductions of $3/4$, $2/3$, and $1/2$.

* * * * *